(12) United States Patent
Wills et al.

(10) Patent No.: US 12,190,139 B1
(45) Date of Patent: Jan. 7, 2025

(54) SECURE SUPPORT OF CUSTOMIZATION SCRIPTS USING PIPELINING

(71) Applicant: Cisco Technology, Inc., San Jose, CA (US)

(72) Inventors: Dean Connable Wills, Berkeley, CA (US); Karthik Krishnamurthy, San Ramon, CA (US); Ivan Sopin, Dublin, CA (US); Allan Bradley Winslow, Rancho Mission Viejo, CA (US); Brian Henry Kirouac, Cupertino, CA (US); Senthilnathan Arunagirinathan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 268 days.

(21) Appl. No.: 17/690,525

(22) Filed: Mar. 9, 2022

Related U.S. Application Data

(60) Provisional application No. 63/194,896, filed on May 28, 2021.

(51) Int. Cl.
  *G06F 9/44* (2018.01)
  *G06F 9/455* (2018.01)
  *G06F 21/62* (2013.01)

(52) U.S. Cl.
  CPC ........ *G06F 9/45512* (2013.01); *G06F 21/629* (2013.01)

(58) Field of Classification Search
  CPC .............. G06F 9/45512; G06F 21/629; G06F 11/3055; G06F 11/3466; G06F 11/3636; G06F 11/302; G06F 11/3664

(Continued)

(56) References Cited

U.S. PATENT DOCUMENTS

| | | | |
|---|---|---|---|
| 11,093,518 B1 * | 8/2021 | Lu | G06F 11/3476 |
| 11,106,442 B1 * | 8/2021 | Hsiao | H04L 67/02 |
| 11,436,328 B1 * | 9/2022 | Strogov | G06F 16/128 |

(Continued)

OTHER PUBLICATIONS

"Install OneAgent on Linux", online: https://www.dynatrace.com/support/help/technology-support/operating-systems/linux/installation/install-oneagent-on-linux/, accessed Jun. 10, 2021, 8 pages, Dynatrace LLC.

(Continued)

*Primary Examiner* — Chuck O Kendall
(74) *Attorney, Agent, or Firm* — BEHMKE INNOVATION GROUP LLC; James M. Behmke; Keith O. Mitchell

(57) ABSTRACT

In one embodiment, a device performs a detection stage of an automated instrumentation pipeline during which the device detects an application server type by examining a command line of a process of an application. The device performs, based on the application server type, an extraction stage of the automated instrumentation pipeline during which the device extracts application server attributes. The device performs, based on the application server attributes, a naming stage of the automated instrumentation pipeline during which the device forms a naming hierarchy for processes of the application. The detection stage, the extraction stage, and the naming stage of the automated instrumentation pipeline do not have access to a controlled space of the application. The device inserts, based in part on the naming hierarchy, arguments into command lines of processes of the application that cause the processes of the application to be instrumented at runtime.

20 Claims, 14 Drawing Sheets

(58) Field of Classification Search
USPC .................................................. 717/123–127
See application file for complete search history.

(56) References Cited

U.S. PATENT DOCUMENTS

| | | |
|---|---|---|
| 2005/0091582 A1 | 4/2005 | Snover et al. |
| 2011/0145786 A1 | 6/2011 | Fayed et al. |
| 2011/0219208 A1* | 9/2011 | Asaad ................... G06F 9/06 |
| | | 712/12 |
| 2017/0078161 A1 | 3/2017 | Cimprich et al. |
| 2017/0161044 A1 | 6/2017 | Singh et al. |
| 2019/0116209 A1 | 4/2019 | Harrison et al. |

OTHER PUBLICATIONS

"Customize the Names of Process Groups", online: https://www.dynatrace.com/support/help/how-to-use-dynatrace/process-groups/configuration/customize-the-name-of-process-groups/, accessed Jun. 10, 2021, 5 pages, DynaTrace LLC.

"Customize the Structure of Process Groups", online: https://www.dynatrace.com/support/help/how-to-use-dynatrace/process-groups/configuration/adapt-the-composition-of-default-process-groups/, accessed Jun. 10, 2021, 5 pages, DynaTrace, LLC.

"Cobra", online: https://github.com/spf13/cobra, accessed Feb. 9, 2020, 5 pages, github.com.

"ld.so, LD-Linux.so—Dynamic Linker/Loader", online: https://man7.org/linux/man-pages/man8/ld.so.8.html, accessed Feb. 9, 2022, 13 pages.

"Policy Language" online: https://www.openpolicyagent.org/docs/latest/policy-language/, accessed Feb. 9, 2022, 51 pages.

* cited by examiner

```
cd $ (mktemp -d -t appd-zero-XXXXXXX) \
&& curl https://download-files.appdynamics.com/download-file/zero-agent-bootstrap/20.6.0.1637/appdynamics-zero-agent-bootstrap-20.6.0.1637.sh -o zero-agent.sh \
&& chmod +x zero-agent.sh && ./zero-agent.sh download sun-java -v 20.6.0.30555 -c
bd56e15a24cc6a09919cb7f0dfe61082 \
&& ./zero-agent.sh download ibm-java -v 20.6.0.30555 -c 4ed2884c5918d5533d12ac781677b2e0 \
&& ./zero-agent.sh download machine -v 20.7.0.2694 -c c7c7clcc7f349e4bdde74ca372c9b5ed \
&& ./zero-agent.sh download infra -v 21.4.0.1740 -c c793f0b32464e8b0847c7d09722f61ee \
&& ./zero-agent.sh download zero -v 20.6.0.1637 -c 04574538938c9c4bcee760efb41d82b
```

```
sudo ./zero-agent.sh install --application 'appl' --account 'appdynamics' --access-key
'87c26254fe5e-fbe0-400a-a76b' --service-url 'https://customer1.saas.appdynamics.com'
```

```
$ nm -A /usr/lib/jvm/java-1.8.0-openjdk-1.8.0.252.b09-2.el7_8.x86_64/jre/bin/java | grep __libc_start_main
/usr/lib/jvm/java-1.8.0-openjdk-1.8.0.252.b09-2.el7_8.x86_64/jre/bin/java:   U
__libc_start_main@@GLIBC_2.2.5
```

```
$ nm -A /lib64/libc.so.6 | grep __libc_start_main
/lib64/1libc.so.6:0000000000022460 T __libc_start_main
```

```
$ nm -A libpreload.so | grep __libc_start_main
libpreload.so:00000000000016cc T __libc_start_main
```

```
// Evaluate performs the detection/extraction/configuration pipeline for a process and puts generic
// and appserver-specific attributes to the AttributeMapType, as well as the AppD agent configuration attributes
// from the configuration policy script.
//   attrMap:  the AttributeMapType containing the attributes initially detected by the caller.
//             This attribute map is updated by the ZIEvaluator as a result of the
//             Detection/Extraction/Naming process
//
//   return value:   the error that was detected, or nil if no error was detected
Evaluate (attrMap types.AttributeMapType) *zlerrors.ZIError
```

```
// Detector interface describes the functionality to examine the initial set of process attributes (including
// command line, environmental attributes, and working directory), to determine if it can be recognized.
type detector interface {
    // Detect attempts to recognize the process.
    Detect () (bool, *zlerrors.ZIError)
}
```

```
// Extractor interface describes the functionality to examine the initial set of process attributes (including
// command line, environmental attributes, and working directory), to determine if it can be recognized
type extractor interface {
    // Extract collects the application-server specific attributes for a process.
    Extract () *zlerrors.ZIError
}
```

```
javaAgentJarArg          = "-javaagent :%s"
controllerHostNameArg    = "-Dappdynamics.controller.hostName=%s"
controllerPortArg        = "-Dappdynamics.controller.port=%d"
controllerSslArg         = "-Dappdynamics.controller.ssl.enabled=%t"
accountNameArg           = "-Dappdynamics.agent.accountName=%s"
accessKeyArg             = "-Dappdynamics.agent.accountAccessKey=%s"
applicationNameArg       = "-Dappdynamics.agent.applicationName=%s"
tierNameArg              = "-Dappdynamics.agent.tierName=%s"
nodeNameArg              = "-Dappdynamics.agent.nodeName=%s"
proxyHostArg             = "-Dappdynamics.http.proxyHost=%s"
proxyPortArg             = "-Dappdynamics.http.proxyPort=%d"
```

$ <path-to-zero-agent>/bin/zeroct1 configure --disable-instrumentors "glassfish, weblogic,websphere"

FIG. 17

SECURE SUPPORT OF CUSTOMIZATION SCRIPTS USING PIPELINING

RELATED APPLICATION

This application claims priority to U.S. Prov. Appl. Ser. No. 63/194,896, filed May 28, 2021, entitled SECURE SUPPORT CUSTOMIZATION SCRIPTS USING PIPELINING, by Wills, et al., the contents of which are incorporated herein by reference.

TECHNICAL FIELD

The present disclosure relates generally to computer systems, and, more particularly, to secure support of customization scripts using pipelining.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

Application performance management (APM) in this manner is often based on collecting performance data from sets of APM "agents" dispersed on software code throughout the network. Installing, configuring, instrumenting, and upgrading these agents, however, can take a significant amount of time and effort which, in some cases, increase with the number of hosts and applications in a given entity's topology. Additionally, allowing customization of these agents may create security vulnerabilities and may lead to solutions that are insufficient to address many of the complex problems associated with APM solutions.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7-11 illustrate example command line interfaces for secure support of customization scripts using pipelining;
FIGS. 13-17 illustrate further example command line interfaces for secure support of customization scripts using pipelining.

DESCRIPTION OF EXAMPLE EMBODIMENTS

Overview

Figure 1A:
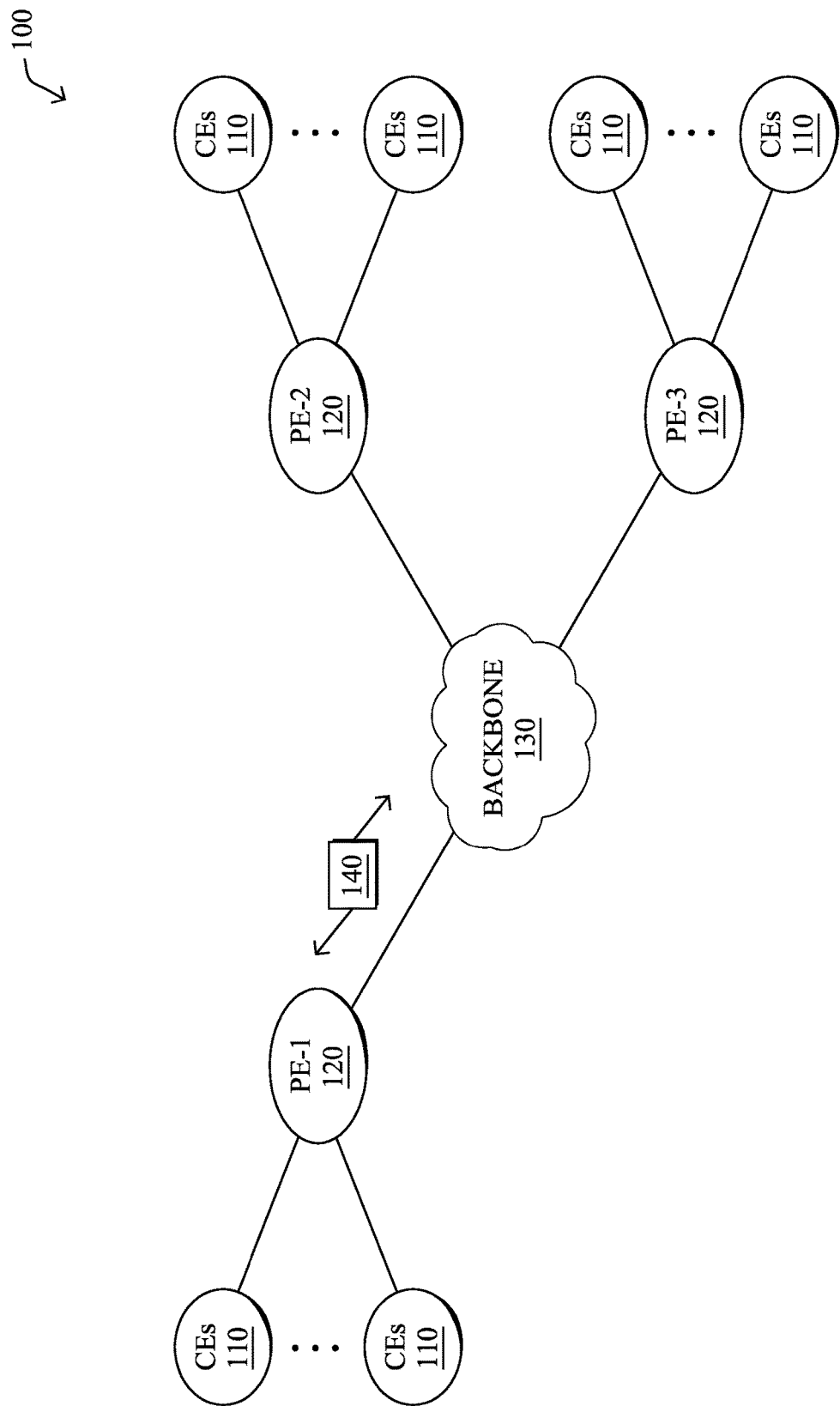
FIGS. 1A-1B illustrate an example computer network.

According to one or more embodiments of the disclosure, a device performs a detection stage of an automated instrumentation pipeline during which the device detects an application server type by examining a command line of a process of an application. The device performs, based on the application server type, an extraction stage of the automated instrumentation pipeline during which the device extracts application server attributes. The device performs, based on the application server attributes, a naming stage of the automated instrumentation pipeline during which the device forms a naming hierarchy for processes of the application. The detection stage, the extraction stage, and the naming stage of the automated instrumentation pipeline do not have access to a controlled space of the application. The device inserts, based in part on the naming hierarchy, arguments into command lines of processes of the application that cause the processes of the application to be instrumented at runtime.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
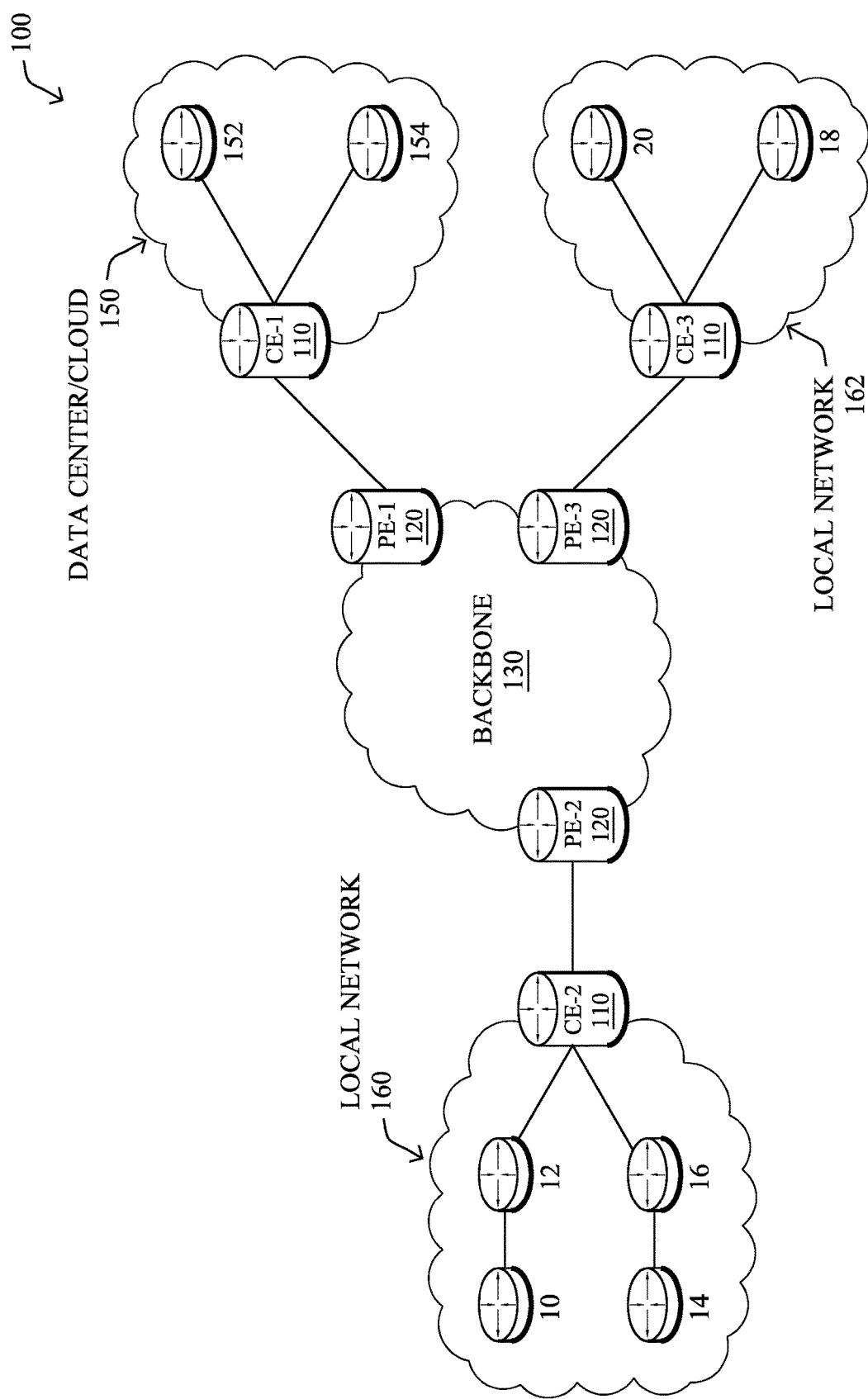

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
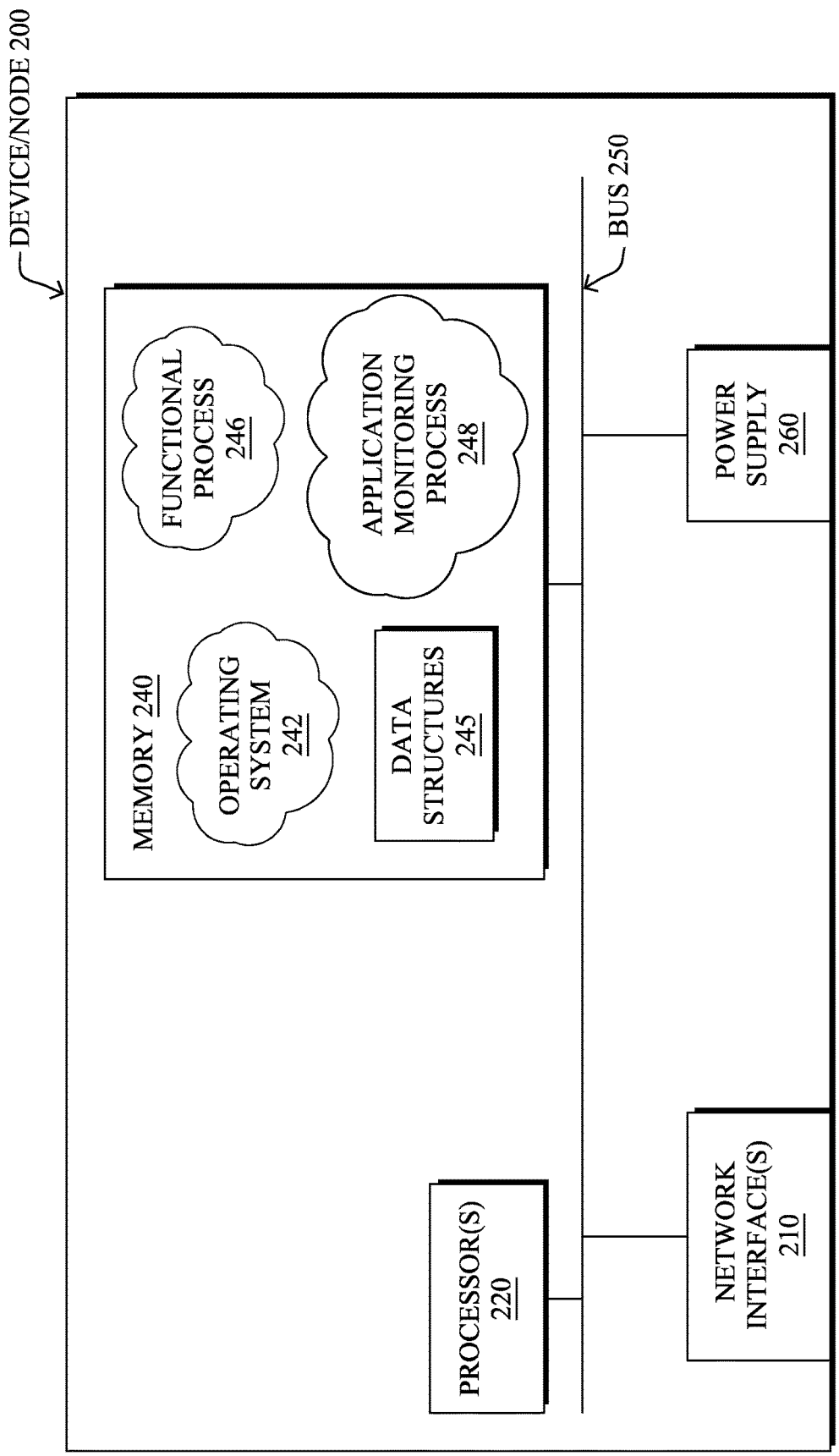
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections via network interface(s) 210, e.g., wireless and wired/physical connections, and that the view herein is merely for illustration. Also, while network interface(s) 210 are shown separately from power supply 260, for devices using powerline communication (PLC) or Power over Ethernet (POE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative monitoring process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
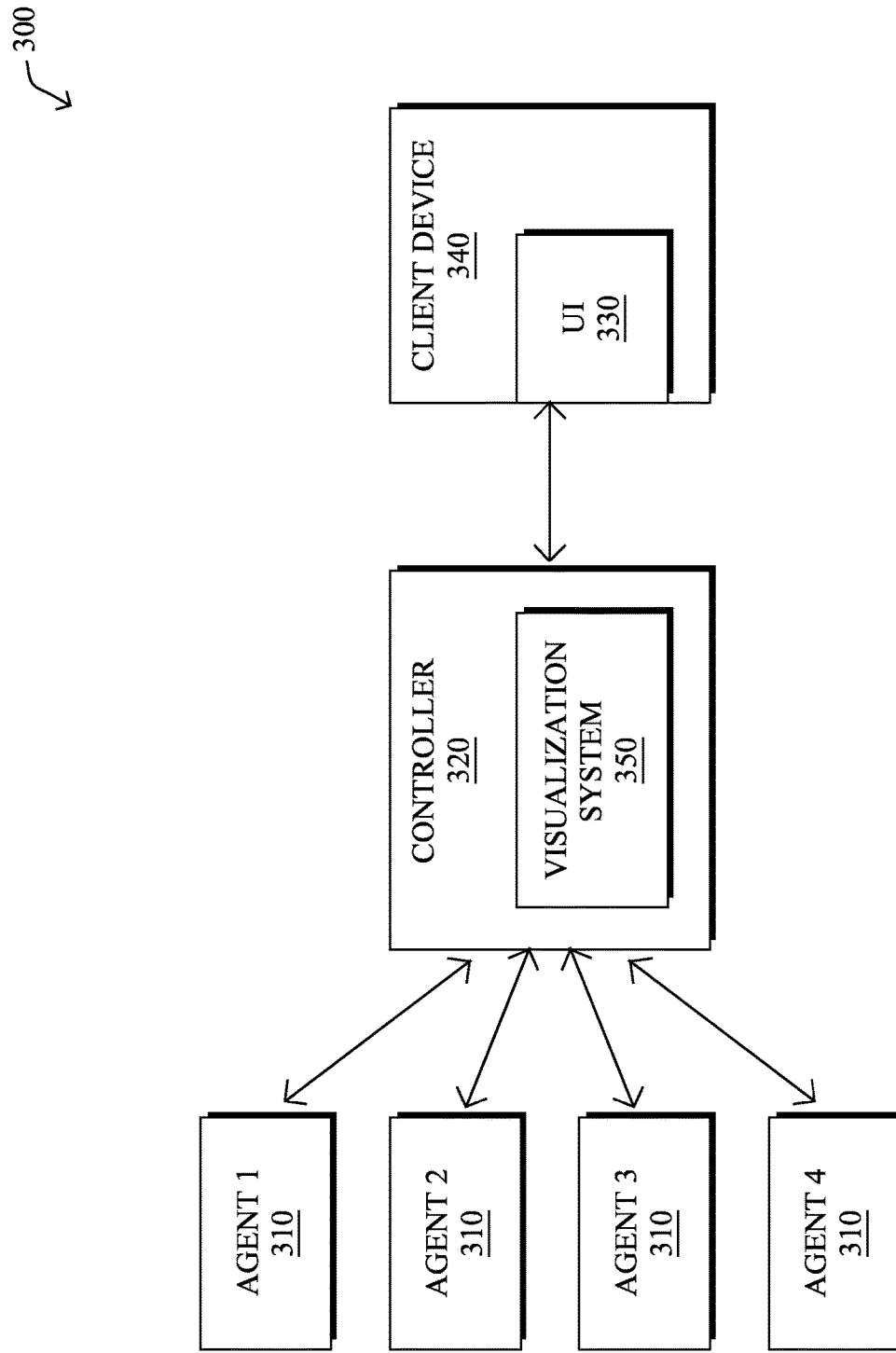
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance may be hosted remotely by a provider of the application intelligence platform 300. In an illustrative on-premises (On-Prem) implementation, a controller instance may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the extensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
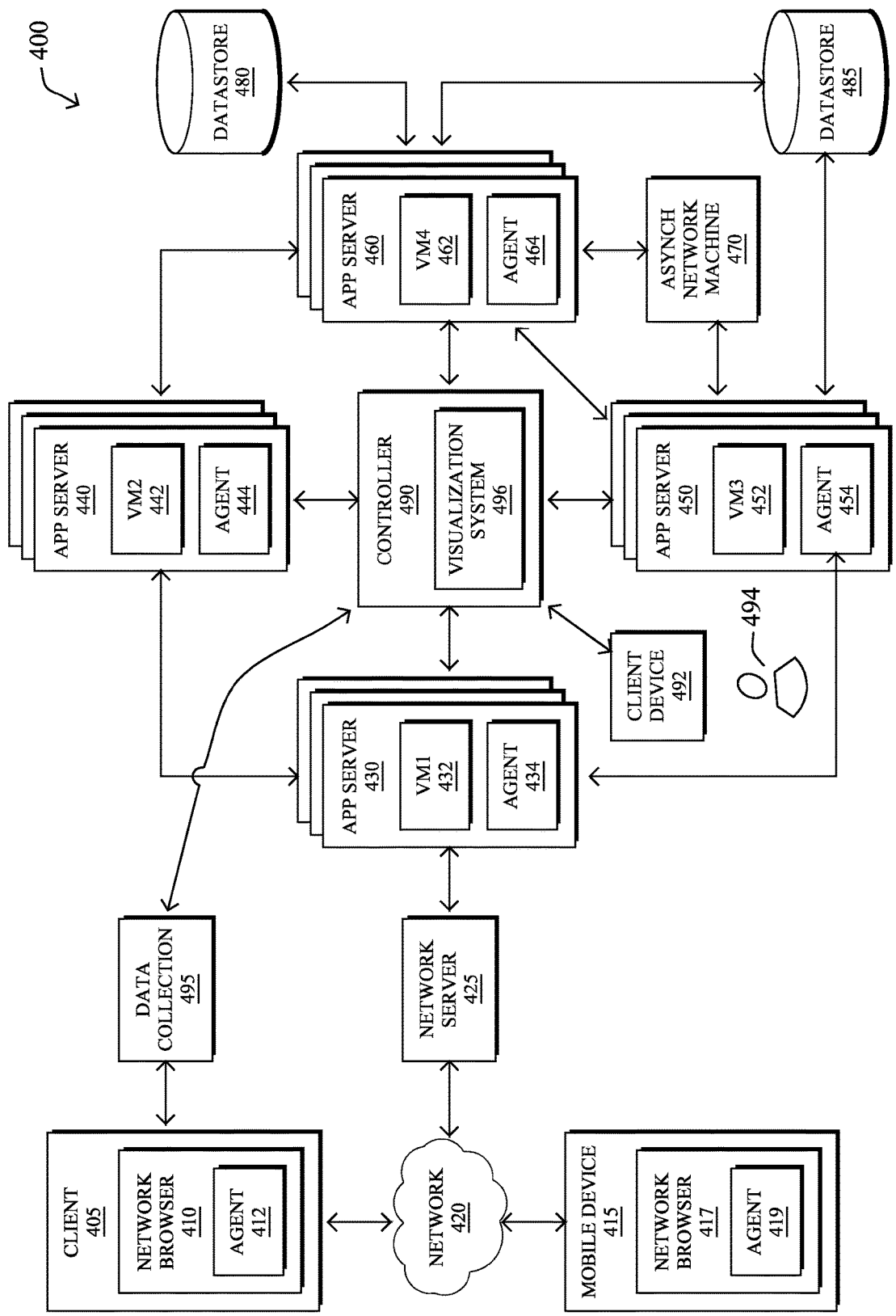
FIG. 4 illustrates an example system for implementing the example application intelligence platform.

FIG. 4 illustrates an example application intelligence platform (system) 400 for performing one or more aspects of the techniques herein. The system 400 in FIG. 4 includes client 405, client device 492, mobile device 415, network 420, network server 425, application servers 430, 440, 450, and 460, asynchronous network machine 470, data stores 480 and 485, controller 490, and data collection server 495.

The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection server 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor application 432 running in a virtual machine (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or mobile device 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client device 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
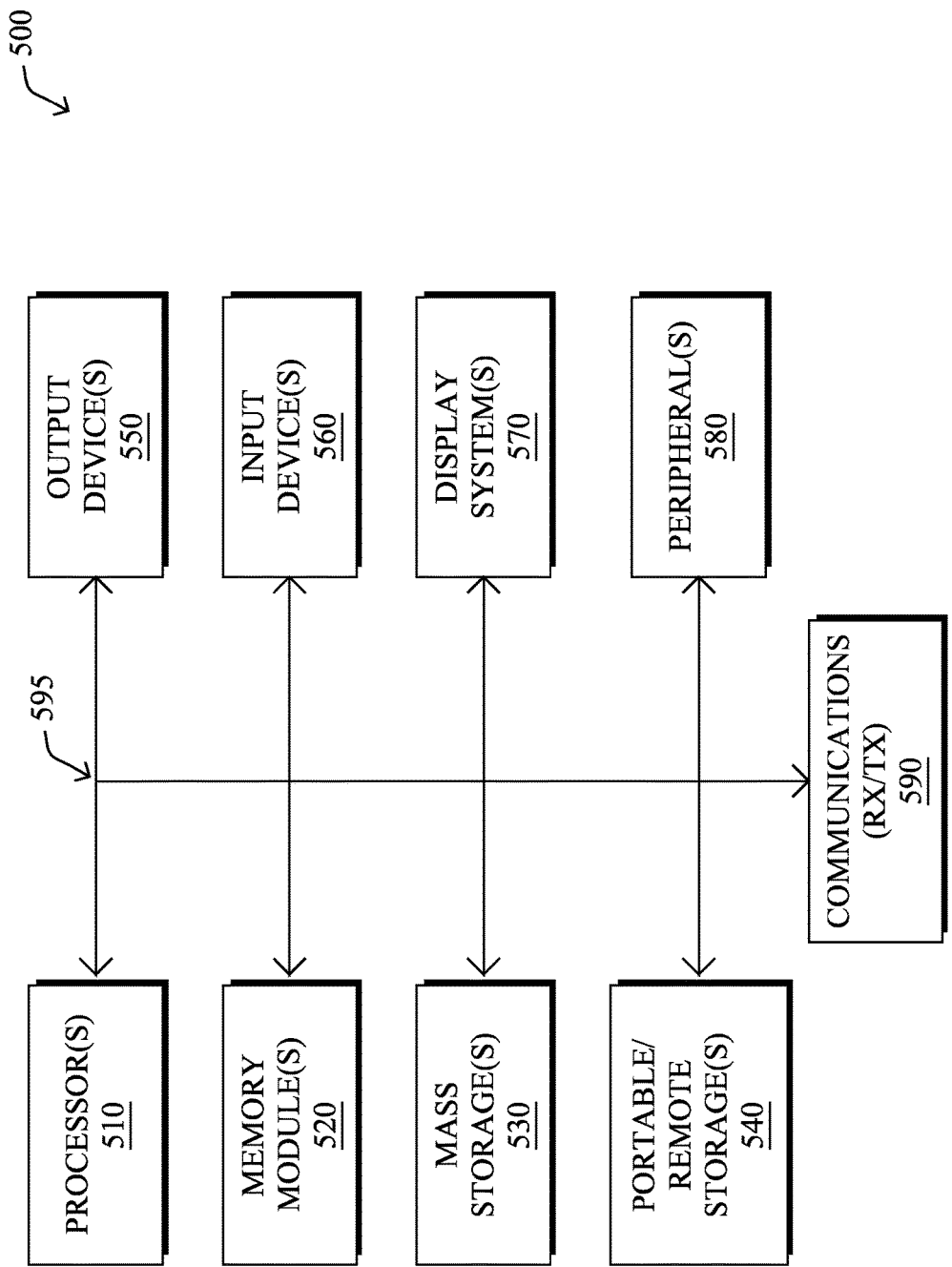
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of client 405, client device 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processor(s) 510 and memory 520. Main memory 520 stores, in part, instructions and data for execution by processor(s) 510. Main memory 520 can store the executable code when in operation. The system 500 of FIG. 5 further includes a mass storage device 530, portable/remote storage(s) 540, output devices 550, user input devices 560, display system(s) 570, and peripheral(s) 580.

The components shown in FIG. 5 are depicted as being connected via a single bus 590. However, the components may be connected through one or more data transport means. For example, processor(s) 510 and main memory 520 may be connected via a local microprocessor bus, and the mass storage device 530, peripheral(s) 580, storage(s) 540, and display system(s) 570 may be connected via one or more input/output (I/O) buses.

Mass storage device 530, which may be implemented with a magnetic disk drive or an optical disk drive, is a non-volatile storage device for storing data and instructions for use by processor(s) 510. Mass storage device 530 can store the system software for implementing embodiments of the present disclosure for purposes of loading that software into main memory 520.

Portable/remote storage(s) 540 may operate in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the storage(s) 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system(s) 570 may include a liquid crystal display (LCD) or other suitable display device. Display system(s) 570 receives textual and graphical information, and processes the information for output to the display device.

Peripheral(s) 580 may include any type of computer support device to add additional functionality to the computer system. For example, peripheral(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

As noted above, APM solutions allow for the monitoring of an application's performance through the use of agents. Broadly speaking, APM may generally be implemented using two kinds of agents: Infrastructure Agents and Language Agents. The infrastructure agents, e.g., a Machine Agent and an Inframon Agent, are responsible for monitoring the entity's infrastructure resources such as host-level resources like CPU, memory and disk. On the other hand, the language agents (e.g., Java Agent, .NET agent, etc.) are responsible for monitoring the entity's applications that are running on a specific runtime like JVM and .NET core.

These two types of agents also differ in the way they are deployed. The infrastructure agents typically run as one or more standalone processes that collect and publish key metrics and events to the controller. The language agents, on the other hand, typically run along with the respective runtime. For example, a Java Agent may be injected into a JVM by specifying a special JAR file in the command line. Every runtime has a mechanism to be injected with an APM agent.

While the two types of agents differ in their deployment and operation, they share a common pain point: installing, configuring, instrumenting, and upgrading these agents take a significant amount of time and effort which, in some cases, increase with the number of hosts and applications in entity's topology. This effort is either incurred completely by the entity (e.g., business, government, school, etc.) or shared with professional services and field engineers.

—Secure Support of Customization Scripts Using Pipelining—

According to one or more embodiments of the techniques herein, an agent, referred to herein as a "Zero Agent" is primarily responsible for managing the installation, configuration and in some cases, enabling auto-instrumentation of several agents. As used herein, the term "Zero Agent" can refer to a standalone process that is responsible for communicating with backend services to report instrumentation states of currently active Java Processes.

To aid in the description of the techniques introduced herein, it is important to first note how an APM solution organizes information about an application. In general, a "node" in the APM model herein corresponds to a monitored server or JVM in the application environment. A node is the smallest unit of the modeled environment. Depending on the agent type, a node may correspond to an individual application server, JVM, CLR, PHP application, Apache Web server.

Also, a "tier" is a unit in the APM model herein composed of a grouping of one or more nodes. How a tier is organized may be a function of the conceptual model of the deployment environment. Often, a tier is used to a group of a set of identical and/or redundant servers. However, this is not strictly required, and a tier can group any set of nodes, identical or not, for which performance metrics are to be treated as a singular unit.

Note that the detection, instrumenting, and naming concept described herein is based on an illustrative APM platform that employs a simplified model of the entity environment in order to analyze performance and provide value. For instance, each instrumented process of an application may be mapped to the following model/hierarchy: Application: Tier: Node. That is, the APM platform models the entity application by associating instrumented processes with Nodes, grouping Nodes into Tiers, and Tiers into Applications. This is a multilevel partition as each Node belongs to exactly one Tier, and each Tier belongs to exactly one Application. Note that other models/hierarchies (e.g., with greater or fewer levels) may also be used, as desired.

In general, what is measured by the APM platform fits within this organizational structure: Business Transactions flow from Tier to Tier within an Application. Note, though, that Cross Application Business Transactions, when supported, are generally deprioritized. It is also important to note herein that a redundancy model is the level that is a duplication, with the next higher level representing a cluster. The most common redundancy model is the Node redundancy model. In this model, all nodes within a tier perform the same role, and each tier is a cluster. The node redundancy model has each node performing a different role, and the Application redundancy model is that the tiers themselves are units of redundancy. As examples:

- Node redundancy model: In this model, a tier performs a single function, and nodes are units of scale, so we can imagine a webserver that needs to scale based on traffic, and each node is a complete implementation of the webserver. The application may have other tiers to represent the backstore or any other function.
- Tier redundancy model: Each node performs a different function, and the conglomeration of function is a tier. One might imagine an application that represents some functionality, and a tier performs a complex function, but there are tiers for scale, region, or readiness, so that the tiers contain the same processes. For example, duplicated East and West, or Dev, Test, Staging, and Prod.
- Application redundancy model: Each Application contains the same structure. One might view the previous example at one level higher, and see Webserver-East and Webserver-West.

"(Auto-) Instrumentation," in the APM model herein, involves injecting a specific type of agent into a running instance of an application so that the agent begins to gather metrics and events of interest and reports them to the controller. In Java, for example, instrumentation takes effect by injecting the -javaagent argument in the JVM command line. Typically, the injection of this agent is done manually by augmenting one or more scripts in the entity's infrastructure. Auto-instrumentation, as the name suggests, is the act of injecting an APM agent automatically when a Java application is started.

When a process is executed on a Unix-like system, one of the important steps that happens is symbol resolution. Every symbol required by the process must either be found in the executable or one of the dependent shared libraries. "LD_PRELOAD" is an environment variable that can be set, on a Unix like system, to a shared library. When set, the OS prioritizes the specified shared library above all the other shared libraries for consultation during symbol resolution. In other words, if a symbol is required by the executable and the shared library pointed to by LD_PRELOAD defines that symbol the OS ensures that the symbol is resolved at runtime from this shared library.

An illustrative "/etc/ld.so.preload" file, if present, can contain one or more shared libraries that serve the same purpose as LD_PRELOAD. With LD_PRELOAD, only processes that are started with this environment variable can take advantage of the symbol resolution explained above. The /etc/ld.so.preload file, on the other hand, has a global effect and does not require an environment variable. Also, multiple such shared libraries can be specified. In the Zero Agent introduced herein, one such library may be built for this specific purpose and is called "libpreload.so."

"Instrumentable processes" are essentially processes that are worthy of instrumentation. A Linux system may run several processes but not all processes require a Java Agent to be injected. For instance, if the Java Agent is the only language agent supported, then Java processes would be the only ones considered worthy of auto-instrumentation. Furthermore, it may be decided to ignore specific invocations of the Java command line like java-version. All other processes (e.g., python, grep, awk, etc.) may thus be considered "uninstrumentable processes."

Instrumentable processes are further classified into managed and unmanaged. "Unmanaged Processes," in particular, are processes that are already instrumented with a Java Agent (through any APM product). All other instrumentable processes are "managed processes." For example, a Tomcat or JBoss application server that is not already instrumented by a Java Agent is an example of a managed process. The term managed here indicates that its instrumentation is being automatically managed by the illustrative Zero Agent herein.

The above has thus far only discussed the introduction of -javaagent argument in the Java command line. There are other arguments that must be introduced in the command line like the controller's URL, the node name, the tier name, etc. "Command line decoration" is the process of augmenting (or decorating) the command line with the required arguments so that auto-instrumentation is possible. The component that does this decoration in Zero Agent is aptly called the "decorator" and is packaged as a shared library called libdecorator.so.

The decorator is responsible for receiving the command line as an input and provide the "decorated" command line as the output. As described herein, in particular, the pipeline that the command line goes through to get decorated is the "Detection-Extraction-Naming Pipeline." The "detection" phase detects the type of the Java process represented in the command line. For example, the detection phase may detect that the command line of the current process represents a Tomcat application server. The "extraction" phase is responsible for extracting important pieces of information based on the detected server type. So, once a Tomcat application server is detected, the extraction phase can extract CATALINA_HOME, CATALINA_BASE, the deployed applications from the webapps directory, etc. Finally, the "naming" phase makes use of the information obtained in the previous two phases to come up with a suitable name for tiers and nodes. As used herein, this pipeline may be referred to as the "Zero Language library" (or ZL library).

Regarding Naming Rules, as discussed, the auto-instrumentation must inject not just the -javaagent argument into the command line but also other arguments for "nodes" and "tiers." The "naming" phase in the aforementioned pipeline is responsible for coming up with these names which are also visible in the APM platform's controller. Furthermore, entities often associate meaning to these names. For example, in the context of an ecommerce domain, the entity may name the tier as "checkout" to mean the set of processes that together form the backend of the "checkout" functionality. Similar logic applies to node names as well. In Zero Agent herein, these names may be injected automatically into the command line. To facilitate this, Zero Agent has a "default" naming rule that looks at the attributes identified in the detection and extraction phases and comes up with a name for tiers and nodes which are then injected into the command line.

Notably, while the default names for tiers and nodes may satisfy some entities, other entities, especially those with complex topology, require flexibility in these names. As such, Zero Agent allows for these names to be customized using a simple rule engine called "Rego" for Custom Naming Rules.

According to one or more embodiments of the techniques herein, APM platform Java Agents can be injected into any JVM application, though the most important use case from entity's perspective is application servers. Because many entities run Java application servers in one form or another, it is important that the Zero Agent understands certain type of application servers as a priority so that the tiers and nodes can be named appropriately. As an example (and non-exhaustive list), Zero Agent knows to "detect" and "extract" information from the following application servers:
1. Tomcat and TomEE
2. JBoss (standalone and domain)
3. Glassfish
4. WebLogic
5. WebSphere AS and WebSphere Liberty Any JVM instance that does not fall into one of these five application servers is considered as a regular Java application. For instance, a Jetty or Dropwizard based application server may be considered as a regular Java application by Zero Agent.

(Note that just because a particular java process doesn't belong to one of these known application servers doesn't mean that they cannot be named and instrumented. The "default" naming rule takes into account such processes and users can further customize it by providing a custom naming rule.)

Figure 6:
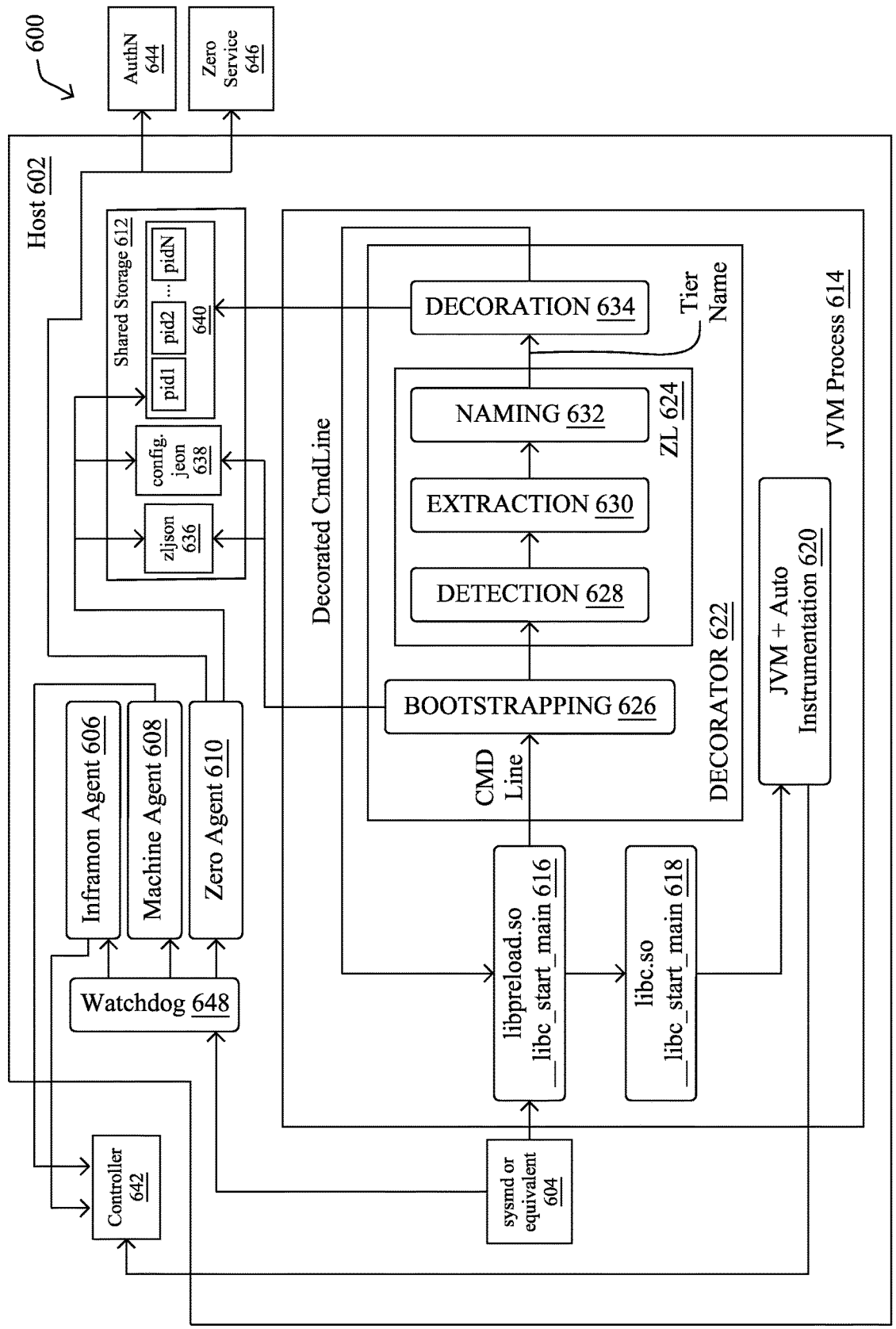
FIG. 6 illustrates an example architecture for secure support of customization scripts using pipelining.

FIG. 6 illustrates an example architecture 600 according to the techniques herein. As shown, a host 602 (e.g., one or more devices 200) may execute a number of different agents, to implement the techniques herein, such as: Inframon agent 606 and Machine agent 608, as described previously above. In addition to these agents, the techniques herein also propose the execution of Zero Agent 610 by host 602 for purposes of automating the instrumentation tasks.

Illustratively, installation of Zero Agent 610 begins first in the Controller UI 642 where the user copies a command to download Zero Agent 610 binaries along with those of agents 606-608. By way of example, FIG. 7 illustrates an example of such an installation command 700 that may be used to install these components to host 602. Note that other UIs and/or other commands may also be used. In general, installation command 700 does several things:
1. It creates a temporary directory.
2. Using curl, a bootstrap shell script is downloaded from the APM platform's downloads portal.
3. The downloaded script is executed several times and each time the desired agent, its version and checksum are supplied to the script.
4. The script, which can be found in bootstrapper/zero-agent.sh in the codebase, then proceeds to download the specific version of the agent and verifies the integrity of the downloaded artifact.

Once the command completes successfully, it should have downloaded the ZIP archives of Zero Agent 610 along with the other agents 606-608.

Next, the command 800 shown in FIG. 8 may be used on host 602 to perform the actual installation. In this specific case, the installation happens as a root user (due to the sudo at the beginning).
1. Once again, the bootstrap script is invoked with a set of arguments.
2. The bootstrap scripts first extract the previously downloaded artifacts into their respective directories.
3. Zero Agent 610 artifact comes with a control utility, called zeroctl. The bootstrap scripts execute this control utility with all the supplied arguments which then completes the installation.

The Zero Agent Control Utility, henceforth referred to as simply zeroctl, is a tool (e.g., written in Go) that acts as the goto tool for installation, configuration, and uninstallation related functionalities. The source code for the tool can be found in the ctl package in the codebase. Illustratively, the zeroctl tool is written using the Cobra framework and as such provides several sub-commands. For installation, the install sub-command—ctl/cmd/install.go and ctl/cmd/install_impl.go—must be specified along with rest of the argument specified to the bootstrap script. The installation does several things. Most notably, the zeroctl install command does the following:
1. Validates that the extracted artifacts contain the expected files and directories.
2. Verifies that no prior installation is currently active. If so, an error is raised prompting the user to first uninstall followed by an install. This limitation will be addressed when we implement the upgrade functionality.
3. Creates the required directory structure in the installation path.
4. The artifacts are copied to the target destinations and proper permissions are applied.
   a. Shared libraries—libpreload.so and libdecorator.so—are copied to/usr/local/lib. 64-bit versions are copied to/usr/local/lib64. These paths are slightly different for debian-based systems. The reason the shared libraries exist outside the installation directory is to support systems with SELinux policies.
   b. Agents 606-610 are copied to the agents directory in the installation path under respective subdirectories. The IBM javaagent.jar from the IBM javaagent artifact is copied to the verXXX directory in the javaagent directory.
5. If systemd 604 (or equivalent) is available and the user did not explicitly disallow it, systemd unit files for Watchdog 648 are created.
6. Configuration files are also created in the configs directory. For instance, Zero Agent 610 may maintain a single configuration file 638 by the name "zeroconfig.json" or another name, as desired.
7. If systemd integration was allowed, then watchdog 648 is started using systemd. Otherwise, watchdog 648 is spawned off in the same shell where the installation took place.
8. The global preload file,/etc/ld.so.preload, is updated to point to the libpreload.so that was copied in 4 (a).

As noted above, during the installation, a watchdog 648 binary may be installed and integrated with systemd 604, if allowed. Generally speaking, regardless of system integration, watchdog 648 may generally be started one way or another at the end of the installation for both root and non-root use cases. The purpose of watchdog 648 is to maintain the uptime of Zero Agent 610 and other managed non-language agents. There are several reasons for implementing a custom watchdog 648 instead of relying on systemd 604.
1. With more non-language agents, it is an overhead to maintain systemd unit files, individually.
2. Non-root installations can benefit from the watchdog as it helps entities keep agents always up and running.
3. With an associated watchdog 648, the techniques herein gain better control of APM agents than with systemd.
4. A cross-platform watchdog 648 is better than writing individual services for each of the nonlanguage agents.

In various embodiments, watchdog 648 herein performs two main operations:
1. A main loop that periodically checks (e.g., every 5 seconds) whether the installed agents 606-610 are running and, if not, starts them.
2. A background thread (Go routine) that monitors for async messages and responds, accordingly. For example, two async messages supported are a request for termination and a request to reload configuration.

Watchdog 648 itself may be managed via systemd 604, if such an integration is allowed. Otherwise, it may be started when the installation concludes after which it is the responsibility of the entity to keep it up and running by integrating it with their known lifecycle management tools.

Regarding auto-instrumentation, one of the key things that the above installation achieves is adding a preload library 616 introduced herein, which is referred to as "libpreload.so" in FIG. 6 to the/etc/ld.so.preload file 618. By doing so, the system herein successfully created an agreement between the preload library herein and the Linux Kernel's dynamic loader. Specifically, in the preload library herein, an important runtime function is established, "_libc_start_main," which is defined herein. This function (or more generically, symbol) is the main entry point into any executable compiled for Linux. In various executables (e.g., every), this symbol will be marked as undefined, which means it must be externally satisfied by a shared library.

By way of example, FIG. 9 illustrates the result 900 when running the nm utility on the java executable on Linux. The presence of 'U' in the output indicates that it is undefined within the executable.

The library that typically satisfies this symbol is libc.so. So, if the same nm command is run on libc.so, the result 1000 is shown in FIG. 10. The presence of 'T' in the output indicates that libc.so.6 on that system satisfies the _libc_start_main symbol. So, when the java executable is launched, the dynamic loader will resolve the undefined _libc_start_main in the java executable by satisfying it from the defined symbol in libc.so.6. This is where the agreement (i.e., "contract") set by/etc/ld.so.preload comes into play. The libpreload.so herein also defines the same symbol as is evident from the nm operation 1100 shown in FIG. 11.

Finally, because the special file/etc/ld.so.preload points to the preload library 616 illustrated in FIG. 6, the dynamic loader prioritizes the preload library above libc.so.6 for resolving_libc_start_main and invokes the preload library 616 herein. Once the control reaches preload library 616, the techniques herein are now privy to the process' command line and can perform the following example actions, in various embodiments:

1. Look at the command line to see whether the process 614 (e.g., JVM process) that just started up is java. If not, the system herein can relinquish control and invoke the real_libc_start_main. This may be done by first getting a handle to the real_libc_start_main and then invoking it, accordingly.
2. If the process 614 is indeed a java process, the system herein determines whether it is a trivial invocation (e.g., like java-version) by inspecting the second argument. If so, the system herein invokes the real_libc_start_main.
3. If the process 614 is a non-trivial java invocation, then the system herein dynamically loads the 'libdecorator.so' library for decorator 622 shown in FIG. 6, to decorate the command line with additional arguments. The details on how this decoration happens are discussed below.
4. The decorator 622 returns a new command line which is used to invoke the real_libc_start_main triggering the JVM startup which now gets the new command line with the APM platform's Java Agent injected into it, as shown at 620 in FIG. 6.

The design and implementation of decorator 622 will now be described, to aid in the understanding of the techniques herein. In particular, as discussed previously, once Zero Agent 610 is installed, the preload library 616 is illustratively injected into every Java process and can capture the command line arguments of the current process and invoke the decorator library with it.

On a high-level, decorator 622 may be viewed as implementing an automated instrumentation pipeline that includes any or all of the following stages: bootstrapping stage 626, detection stage 628, extraction stage 630, naming stage 632, and/or decoration stage 634. Such a pipeline 1200 is shown in greater detail in FIG. 12, along with the information gathered at each stage.

Figure 12:
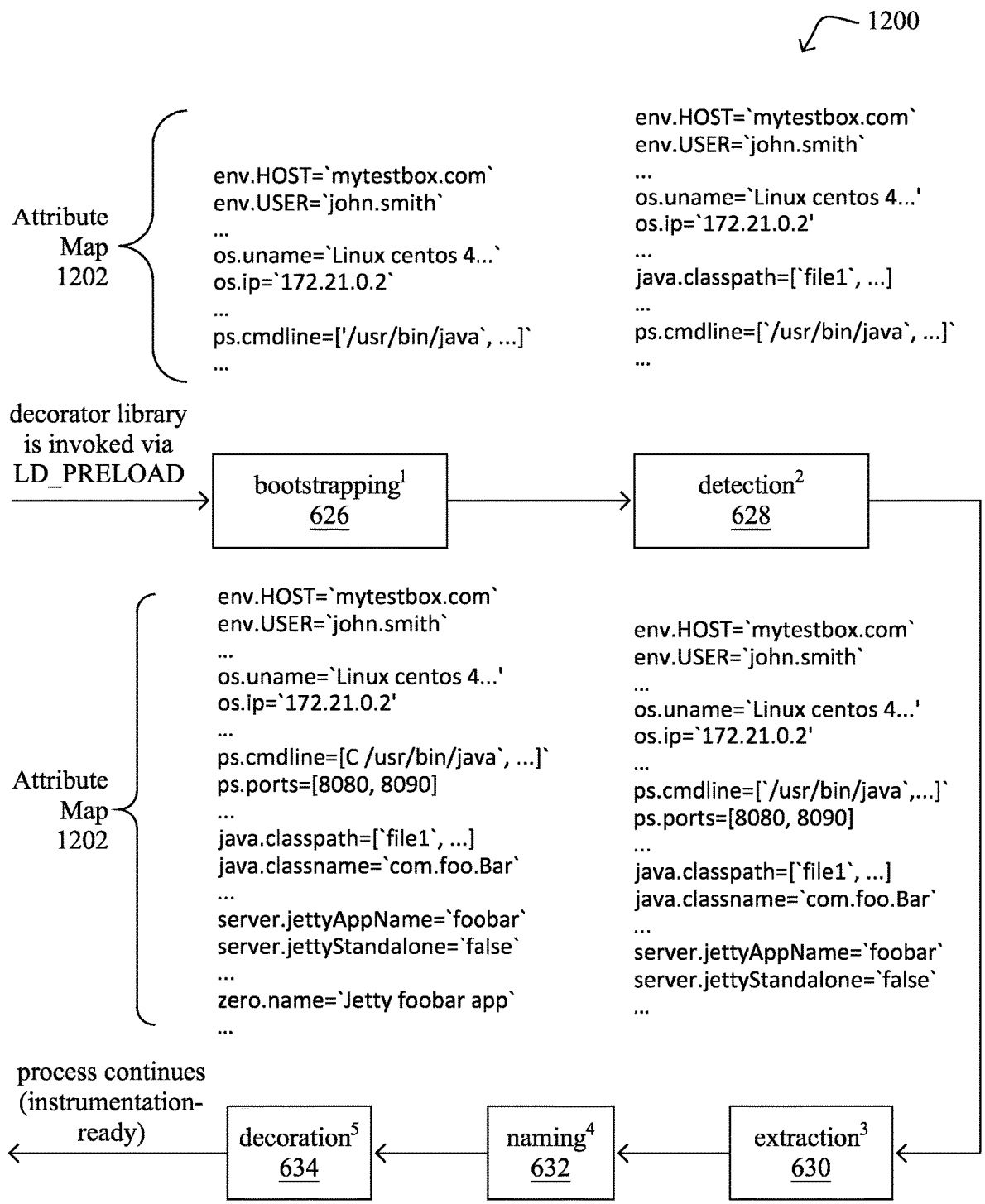
FIG. 12 illustrates an example pipeline for secure support of customization scripts using pipelining.

During the bootstrapping stage 626, decorator 622 gathers several important attributes about the current process 614, such as its process id, the command line arguments, the environment variables, and the current working directory. It then constructs a map, referred to as an attribute map 1202, as shown in FIG. 12, in which these attributes may be stored. This map is then provided as the input to the ZL library 624 that implements the next three stages of pipeline 1200.

The Zero Language Library (or ZL library 624) implements the "detection-extraction-naming" sub-pipeline of pipeline 1200. Illustratively, pipeline 1200 is tailored for Java, but the design can easily accommodate other languages runtimes. Also, illustratively, this pipeline may be implemented as a separate Go package.

The main entry point into the sub-pipeline is the function 1300 shown in FIG. 13. In particular, Evaluate performs detection stage 628, extraction stage 630, and naming stage 632 for a process 614 and puts generic and appserver-specific attributes to the AttributeMapType, as well as the agent configuration attributes from the configuration policy script. The "attrMap" is the AttributeMapType containing the attributes initially detected by the caller. This attribute map is updated by the ZIEvaluator as a result of the Detection/Extraction/Naming process. The return value is the error that was detected, or nil if no error was detected.

During detection stage 628, the ZL library 624 looks at the command line captured via preload library 616 and identifies the type of the Java application server that it represents. For example, if the main class name in the command line is org.apache.catalina.startup.Bootstrap, the process 614 may be identified during detection stage 628 as a Tomcat application server. As another example, if the classpath argument in the command line contains jboss-modules.jar, detecting stage 628 may identify process 614 as a JBoss application server. Similar logic is implemented for Glassfish, Websphere and WebLogic application servers. If none of the known application server are detected, the process 614 may be identified as a "plain" Java process.

In some embodiments, the detection stage 628 may be implemented as individual detectors (tomcat-detector, jboss-detector, etc.) all of which implement the interface 1400 shown in FIG. 14. Namely, the Detector interface describes the functionality to examine the initial set of process attributes (including command line, environmental attributes, and working directory), to determine if it can be recognized, and the "type detector interface" attempts to recognize the process. In any case, a successful detection results in a new attribute, "AppServerType," that is added to the attribute map with the value corresponding to the type of the application server that was detected.

Next, extraction stage 630 of pipeline 1200 starts on successful completion of the detection stage 628. Much like detection stage 628, extraction stage 630 may also be implemented as individual extractors that all implement the interface 1500 shown in FIG. 15. That is, the Extractor interface describes the functionality to examine the initial set of process attributes, including command line, environmental attributes, and working directory, to determine if it can be recognized. Then, the extract command collects the application-server specific attributes for the process.

Depending on the application server that was "detected," the corresponding "extractor" is invoked. So, for example, if a Tomcat application server was detected, then the Tomcat extractor is invoked. In extraction stage 630, several other attributes of the application server may also be extracted. For example, the Tomcat extractor can extract attributes like CATALINA_HOME, CATALINA_BASE, the deployed applications from the webapps directory, etc. Similarly, the JBoss extractor can extract attributes like deployment mode (domain or standalone), the deployed applications from the configuration files, etc. Finally, once the additional attributes are extracted for the application server, they are once again added to the attribute map 1202 and passed along to the next stage of pipeline 1200, naming stage 632.

In particular, naming stage 632 starts off with the attribute map 1202 having been populated by detection stage 628 and extraction stage 630. By now, attribute map 1202 contains information not just about the OS process, but also the type of application server that was detected. Using this information, naming stage 632 is responsible for coming up with a name for the process, in accordance with the naming hierarchy used by the APM platform. Unlike the previous two stages, naming stage 632 may be implemented using a rule engine, in some embodiments. To this end, naming stage 632 may be configured with a default naming rule, illustratively written in Rego, that comes up with a unique tier name, depending on the information contained in attribute map 1202. Because tier names mean something to the end user, this may also be customizable in that a user may specify a custom naming rule that will be used in place of the default naming rule, in one embodiment.

On successful execution of naming stage 632, a tier name is produced and it is also added to attribute map 1202. At this point, the ZL execution is complete, and control returns back to decorator 622, with attribute map 1202 containing a lot more information than it started with.

Regarding decoration stage 634, at this point, control has come back from the ZL library 624, and the attribute map 1202 contains a lot more information, including any or all of the following: the type of application server that was detected, its attributes, and, most importantly, the tier name to which the process (e.g., process 614) belongs. In this phase, decorator 622 modifies the original JVM command line to enable instrumentation by the APM platform's Java Agent. For instance, decorator 622 may inject the arguments 1600 shown in FIG. 16 into the command line. By way of example, the following arguments may be addressed:

javaAgentJarArg
controllerHostNameArg
controllerPortArg
controllerSslArg
accountNameArg
accessKeyArg
applicationNameArg
tierNameArg
nodeNameArg
proxyHostArg
proxyPortArg To accomplish this, decorator 622 relies on information from the attribute map 1202, the environment variables, and the configuration files created during installation. If all goes well, decorator 622 now possesses the new command line.

Notably, before decorator 622 can provide the new command line to the preload library 616, it first persists (stores) all the information that will, at a later point, be read by Zero Agent 610. Illustratively, decorator 622 may use a simplistic persistence layer: the filesystem of host 602. The information may be persisted into a pid file in the pids directory 640 relative to the root of the installation directory (e.g., in shared storage 612).

There are any one of three important types of information that decorator 622 persists. Among these, the most common and probably the most important one has to do with the instrumentation state of the process which contains information such as:

AppServerType—the type of application server that was detected—tomcat, jboss, etc.
StartTime—the timestamp at which the process started.
TierName—the tier name assigned to this process.
Managed—whether or not the process was managed (not already instrumented; see terminology).
Enabled—whether or not the process was instrumented by the decorator.
(And other types of information that may be persisted.)

The configuration of Zero Agent 610 like most applications, illustratively relies on an on-disk configuration that controls several aspects related to the functioning of the Zero Agent. The configuration file 638 for Zero Agent can illustratively be found under configs/zero-config.json. The configuration file 638 contains general configuration like the agent id, logging levels, Controller 642 configuration (URL, account and application names, access keys, etc), Zero Service 646 configuration, etc.

Regarding ZL configuration file 636, it was discussed previously how decorator 622 and the ZL library 624 implement the pipeline to make auto-instrumentation work. However, it is conceivable, for example, that a host system may be running multiple JVMs some of which are not worthy of instrumentation and users may want to control this. Also, as previously discussed, whenever a process is instrumented, a custom naming rule can be used to provide the tier name of such a process. As detailed herein, such controls are provided in several ways and the details pertaining to it are stored in the configuration file as well.

Notably, it is not uncommon for a user to run only one type of application server, such as either Tomcat or JBoss. Even if there is more than one application server involved, it is unlikely the user is running all the application servers that Zero Agent 610 supports on the same host 602. In such situations, it may be useful to turn off auto-instrumentation for application servers not in use. Disabling instrumentation by application servers can be done by running the command 1700 shown in FIG. 17, for example.

More specifically, execution of command 1700 updates configuration file 636 accordingly to indicate that Glassfish, WebLogic and WebSphere application servers must not be instrumented, leaving JBoss and Tomcat as the only ones that must be instrumented by decorator 622, in this example. This configuration is consulted by ZL library 624 every time a process is intercepted by decorator 622, and if the application server matches one of those listed in the configuration file, it is left untouched.

It may also be desirable to disable instrumentation by tier names, in some embodiments. Even for users running a single type of application server, not all processes are equally important. Consider, for example, an entity running two instances of Tomcat servers. One instance represents the production application and the other instance is a debug application intended for the development team. While the production application must be instrumented and given an appropriate tier name, the debug application may not. Disabling the instrumentation by tier name may be done from the user interface (UI) and proceed as follows:

First time around, both the production and debug application are intercepted and instrumented by decorator 622. For example, they may be given the tier names tomcat,prod and tomcat, dev respectively.

Zero Agent 610 reports the tier names along with their instrumentation states to the Zero Service 646.

The UI, at some later point, queries this information from the Zero Service 646 and displays it to the user.

The user, on seeing the tomcat, dev tier name on the UI, decides that it is not worthy of instrumentation and confirms it by clicking the checkbox next to the tier name.

The decision taken by the user is conveyed to the Zero Service 646.

Next time, Zero Agent 610 reports to the Zero Service 646, this decision is sent back in the response and is persisted by the agent.

At a later point, when the debug application is restarted, it will be intercepted by decorator 622 and, on consulting the configuration file, will decide against instrumenting the process.

For customized naming, if any custom tier naming is in effect, the corresponding Rego rule and the associated mappings are stored in the configuration file. Decorator 622 reads this during the bootstrapping stage and provides it to the ZL library 624 that uses the custom rule depending on the application server that was detected. As to how these custom rules are populated in the configuration file in the first place, they come from the illustrative Zero Service 646, mentioned above.

According to the present disclosure, Zero Agent 610 may take the form of a daemon process that is run on every host system where Zero Agent 610 is installed. For the most part, it is responsible for reporting the state of the processes on the host system to its counterpart, Zero Service 646. In return, Zero Service 646 responds with a (potentially) new configuration that must be applied for processes that are started from that point onwards. Being a long running process, Zero Agent 610 may have a lifecycle built into it. As soon as it starts, it enters a main loop that repeatedly (by default, every 20 seconds, for instance) performs the following:

1. Observe and Report: In this step, Zero Agent 610 is responsible for observing the instrumentation state of Java processes found on the system and reporting it to Zero Service 646. First and foremost, it queries a list of all the running processes on the system and filters the Java processes among them. On Linux, for example, this can be accomplished by traversing the/proc filesystem.

Next, Zero Agent 610 matches the list of Java processes against the pid files present in the pids directory 640. Recall that for every process intercepted by decorator 622, a corresponding pid file is created. For every such successful match, it parses the contents of the pid files and stores it for later use. In some cases, it is possible for Zero Agent 610 to observe a pid on the system for which a corresponding pid file was not created by decorator 622. This means that such a process was not intercepted by decorator which in most cases is because such a process existed even before Zero Agent 610 was installed. For such processes, Zero Agent 610 constructs the attribute map and invokes the ZL library to identify and name such a process. Although such processes are not instrumented by decorator 622, they are still reported as managed processes to the Zero Service. This way, the user will be able to view such processes in the UI. Also, when such processes are restarted, they will be intercepted and instrumented by decorator 622. Next, the agent collects the version information pertaining to the on-disk configuration (as explained earlier). This, along with rest of the information about the instrumentation state of the processes, is included in a request object and sent to Zero Service 646.

2. Configuration Management: Following a successful request, Zero Service 646 returns a response with a potentially new configuration. If the response contains a new configuration, it is merged with the on-disk one and written back to disk which allows future processes to use the new configuration. Also, on receipt of a new configuration, Zero Agent 610 responds back to Zero Service 646 acknowledging the receipt. This is important as, without it, Zero Service 646 may not know until the next check-in that the new configuration was applied on host 602.

3. Garbage Collection: Zero Agent 610 is also responsible for keeping the state of the pids and the logs directory up to date. To this end, every time decorator 622 intercepts a process, a new log file may be created in the logs directory. Over time, this directory may accumulate several such log files. The files created by decorator 622 may be named along with the pid of the process (like, decorator-<pid>.log.done). The .done suffix is indicative of decorator 622 completing its work and that the file can be garbage collected. Zero Agent 610 reads the contents of such .done files and appends them to a unified decorator.log file. This keeps stray files in the logs directory to a minimum. Also, as described previously, decorator 622 also creates a pid file in the pids directory 640. Such pid files typically stay for the lifetime of the Java process and when the JVM is gracefully shutdown, an exit handler implemented in the preload library ensures that such pid files are deleted. However, in some rare cases, the JVM may not have gracefully shutdown. Instead, it may have been terminated forcefully by a SIGKILL. In such cases, the pid files can be left around. Accordingly, Zero Agent 610 may also look for such stray pid files and delete them.

Figure 18:
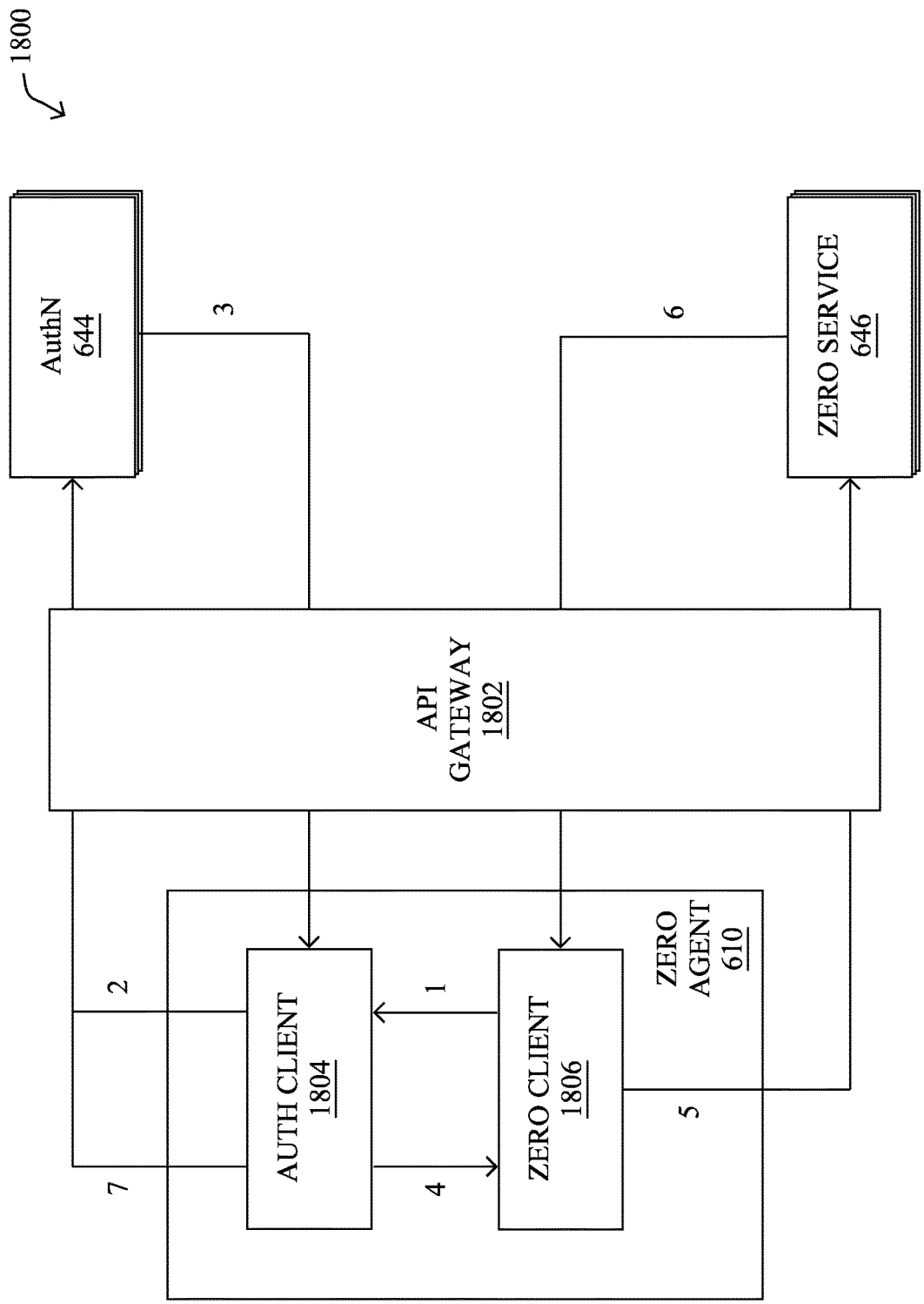
FIG. 18 illustrates an example of authorization for secure support of customization scripts using pipelining.

4. Authentication: Zero Agent 610 may also authenticate itself with Zero Service 646. For instance, it may use OAuth as the authentication protocol, which consists of an "access" token and a "refresh" token. FIG. 18 shows a simplified control flow 1800 that illustrates how Zero Agent 610 comes to possess these tokens. In particular:

i. The Zero Client 1806 of Zero Agent 610 may request an "access" token from the Auth Client 1804 of Zero Agent 610. If the latter already has a valid "access" token, control proceeds directly to (d).

ii. If this is the first time the "access" token is required, Auth Client 1804 makes a request to AuthN service 644 via API gateway 1802 with "singularity" credentials. This involves making a request to the AuthN service 644 with username set to singularity-agent@<account-name> and password set to the access key provided during installation.

iii. Once the basic-auth credentials are validated, AuthN service 644 returns a fresh pair of "access" and "refresh" tokens both of which are stored within Auth Client 1804.

iv. Auth Client 1804 responds to Zero Client 1806 with the "access" token.
v. Zero Client 1806 makes a request to Zero Service 646 with the "access" token just obtained.
vi. On successful validation, Zero Service 646 returns with a response object.
vii. Token pairs returned by the AuthN service 644 expires after a predefined duration (typically, 10 minutes). Once expired, the current "refresh" token is used to request new pairs of "access" and "refresh" tokens.

5. Uninstallation and Purge: Referring again to FIG. 6, much like the installation, uninstallation of Zero Agent 610 may be performed using the previously mentioned zeroctl command. Specifically, the zeroctl uninstall command completes the uninstallation of Zero Agent 610. This command does several things:
   i. Stops Zero Agent 610 and Machine Agent 608, if they are found to be running.
   ii. Removes the preload library 616 from /etc/ld.so.preload.
   iii. Deregisters from systemd 604, if applicable.
   iv. Removes Zero Agent 610 shared libraries and binaries.

It is important to note that the uninstallation may not remove everything from host 602. For instance, uninstallation may leave the agents directory intact along with the configs, pids, and/or logs directory. This allows an entity to upgrade to a newer agent while keeping the configuration and everything else intact. Also, leaving the logs directory intact allows for archiving. To completely remove Zero Agent 610, one of zeroctl uninstall—purge or zeroctl purge may be run. Both commands achieve the same result but the second option allows the purge to be done at a later time. As the name suggests, purge removes all remnants of Zero Agent 610 from host 602 including all the directories that the uninstall command left around.

As described herein, therefore, the techniques provide a pipeline of detecting, extracting, and naming processes within an application (i.e. auto-instrumenting through secure customized node naming of detected tiers/nodes-key-value pairs), without allowing external access to the entity script. That is, the techniques herein are directed to looking at a command line to determine what type of process is running, looking at the corresponding environment (for the type of process) to determine what information is important, naming the process based on the type of process and information extracted, and optionally adding this name to the command line for instrumenting the process.

Notably, this may be specifically performed through alternating execution with sandboxed stages. In particular, customization enables Professional Services or other Entities to adapt a generic software product to their needs and derive otherwise inaccessible business value. There are several methods of Software Customizations, including
   1. Settings, which are knobs that the software explicitly provides for customization.
   2. Calls, which are predefined places that the software supports calling an installable entity module.

Settings tend to be limited to how well the original designers understood how the software might be used over the lifetime of the product, as well as the bandwidth of the developers driving a product to market. Settings are needed but limited. Calls are best for filling exactly these gaps-what no one thought about or had time for.

Unfortunately providing places where arbitrary code can be executed introduces a myriad of security vulnerabilities, in the form of side effects (using up the memory/bandwidth) or rogue accesses controlled space (reading the file system or network or other services without proper blocks and logging).

According to the techniques herein, therefore, it is asserted that custom code should be broken up into an alternating pipeline, where each stage is unable to access controlled space, but is able to request access from the subsequent stage. This stage undergoes a security check and determines whether the accesses are allowed, and if so, provides the data to a subsequent custom code stage. Accesses operate at a higher level of abstraction than the Operating System, in order to permit "contextual access," which will be explained infra.

In particular, a naive solution is to run the installed code at the same permission level as the main software, but this is ineffective, as the main software may be running as superuser, and the customization can neither run as superuser or a regular user, as it is allowed to do the superuser things that the main software is permitted to do, but not the superuser things that the main software does not do due to its security review. In addition, many other security gates are avoided by entity software that has escaped review. A good example is "logging of accesses to controlled space."

A more sophisticated approach to running entity code is needed, in which the execution of the software is controlled, not just by the Operating System, but also by the exacting Security Restraints of the Original Software.

Sandboxing the entity code is a natural solution, but is also difficult to perform in practice. Typically, either interpretive or boxed environments are expensive to develop, maintain, operate, and do not always deliver the goals of the system.

The difficulty of Sandboxing code originates in the diametrically opposed goals of letting the entity software do anything it wants, and provide functionality that does not exist, and the goal of not letting the entity access any controlled space without appropriate safeguards, Security gates, and avoidance of side effects.

Pipelining, according to the techniques herein, attempts to balance this by asking the entity to break up their customization software into chunks that do not access any controlled space or cause side effects. Rather, each stage of the entity code produces Settings and Requests to access Controlled Space. These requests are then processed by the Main Software, subject to the supported security model and constraints. Examples of constraints are white and blacklisting of a file system or network or other hardware, logging of accesses to controlled space in such a way that format and auditing and archiving requirements are satisfied, controlling access by user, and so on.

This pipeline may either be implemented horizontally, or consist of alternating between the customization and request satisfaction in a loop, until both are satisfied. (Note that the accesses themselves are considered Contextual ("contextual accesses"), in that the ultimate data acquired is the protected resource, and not the path. For example, consider a system where Resource A is a list of resources, and it is protected. A direct request to access A should fail, if the list is protected, but a contextual access of retrieving Resource B as pointed to by Resource A, could be allowed. Therefore, the contextual access of A: B might be allowed when a direct access of A is disallowed.)

As a recap of the description above, auto-instrumentation is used to determine where the APM platform Zero Agent fits in the entity's application, and how to assign an appropriate name. In particular, as described in greater detail above, a goal of the techniques herein is automatic runtime detection and instrumentation of a process with an APM platform agent, which is able to then automatically gather information that is sent to the controller for analysis and display. In various embodiments, the pipeline comprises several illustrative stages, such as any or all of the following:

Detection: the act of reading the process information, environment, configuration markers, and other inputs to determine whether the process is something that we should instrument.

Extraction: the act of gathering information in preparation for Naming.

Naming: formulating a name that is not only unique across the organization when fully qualified, but also appropriate to its function and pleasing to the entity.

Instrumentation: the act of attaching our agent to the loading of the process, with appropriate parameters.

Figure 19:
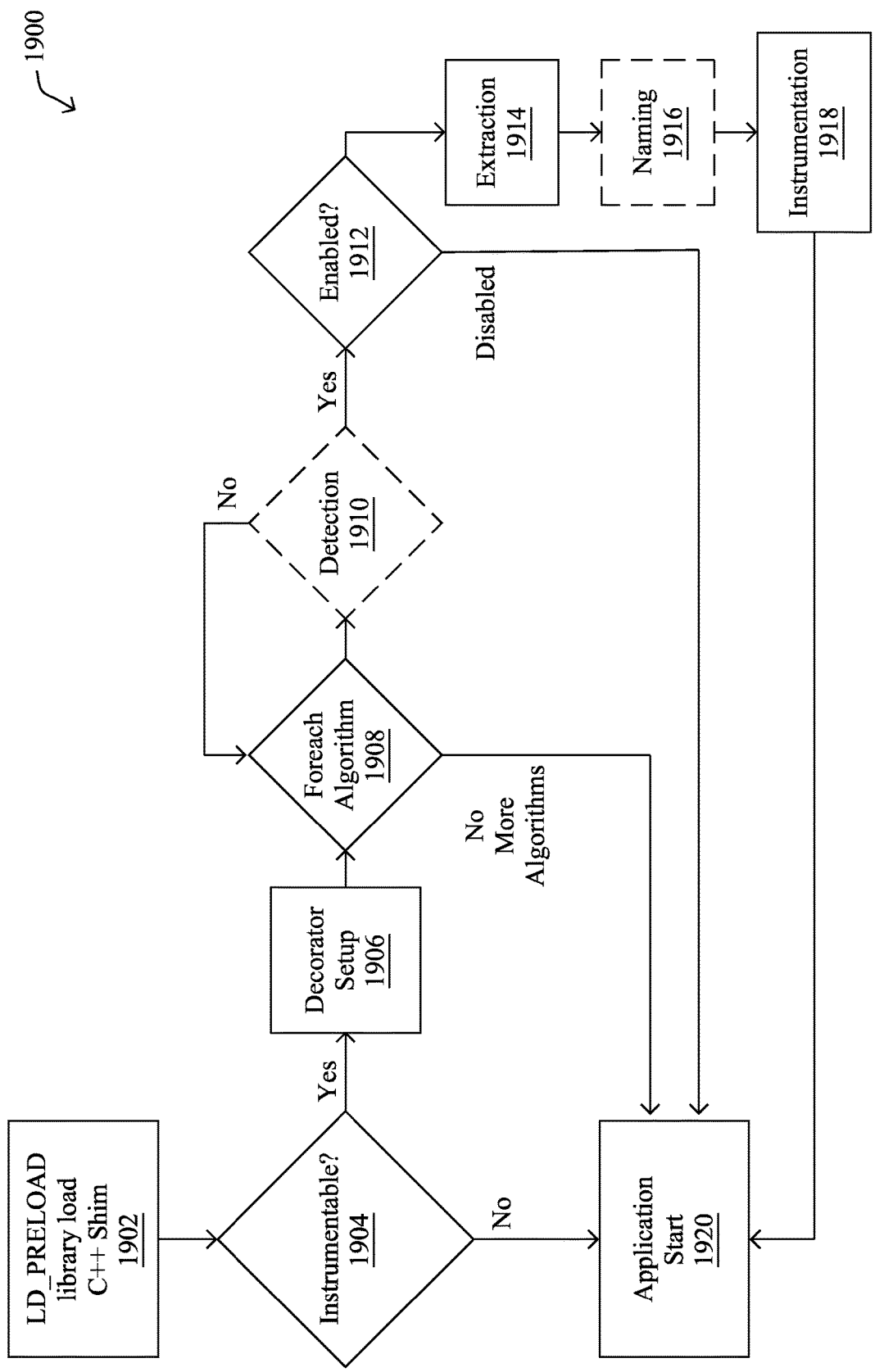
FIG. 19 illustrates another example pipeline for secure support of customization scripts using pipelining.

An alternative view of the pipeline described above (e.g., in FIG. 6 and FIG. 12) is further illustrated in FIG. 19, where an example Auto-Instrumentation dataflow 1900 is shown. In particular, a goal of the primary horizontal pipeline from setup to naming is to generate a map of key-value pairs that may be passed to the instrumentation stage to perform auto-instrumentation of the user application. Initially, at block 1902, the preload library is loaded, so as to be able to capture the command line arguments of the process of the application.

Next, a decision 1904 is made as to whether the process is 'instrumentable.' For instance, certain types of processes (e.g., python, grep, awk, etc.) may be deemed uninstrumentable and control returned back to the application at block 1920. Likewise, certain types of invocations, such as "java-version" may also be intentionally ignored.

Regarding decorator setup at block 1906, the attributes map is pre-populated by decorator 622 with information relative to detection. This would typically include the command line, the environment variables, the hostname and username, relevant OS Information, and other process information. In turn, an iterative loop may begin at block 1908 whereby the decorator examines each algorithm/process.

The detection algorithms may be ordered and presented to the detection stage serially, with the understanding that the first detection match terminates the iteration. A Detection match at block 1910 represents that the algorithm under scrutiny has a hit, based on its attributes map. More specifically, the detection algorithm is executed (a potentially customizable algorithm that takes the attributes map as input and determines whether or not a particular application or application server is identified), where the algorithm is said to "hit" hen the detection algorithm identifies an application. If the algorithm does not hit, execution moves to the next loop iteration and back to block 1908. Otherwise, the attributes map may be modified, and requests for reading of data from files and web addresses may be registered (an example request might be: VARIABLE=<file.xml>: <xpath>). The loop terminates and execution proceeds to the next stage of the pipeline. Note that the input map may be the sole input scope of decorator 622 within the security model, as it does not have file access or external port access.

An "Enabled Check" may be made at block 1912, to see whether the algorithm is disabled. If so, the loop terminates and no instrumentation occurs, as doing so would be unnecessary.

During Extraction at block 1914, registered requests are performed. This data driven stage is illustratively the only stage that is capable of external access, in some embodiments. Requests in this stage are subject to allow-listing and disallow-listing, in some instances. For example, requests may be allowed if they are elements of the relative complement of the blacklist in the whitelist, or W\B. A sample allow and disallow lists may simply be something such as:

allow:
 $HOME/*
disallow:
 /etc/*

Note that all allow and disallow variables must be read from the system and not the Stage Map, unless one can guarantee that the map was not changed by the decorator.

Regarding the Naming step at block 1916, one of challenges entities traditionally face is sorting their processes by role. In a large scale deployment, processes are duplicated in order to match demand while keeping performance within a window of tolerance. This is called vertical scaling. In order to judge whether a vertically scaled system is performing correctly, clusters of processes performing the same function should be measured together, so the performance of the function is monitored rather than the performance of individual processes.

In the illustrative software model of an application, processes are instrumented and represented as nodes. Groups of processes performing the same function are represented as Tiers. The sorting of processes into Applications, Tiers, and Node determines how the data is reported and therefore monitored. Coming up with effective and clear Node and Tier names is one of the main challenges faced herein, since the name goes beyond the form of the data, it defines the function of the data within the model.

That is, one of the greatest configuration challenges entities face is to define with Node and Tier names that are:
  consistent across the organization,
  intuitive and navigable within the APM platform software,
  traceable back to the actual processes from the model,
  accurate as to form and function,
  only as complex as it needs to be, and
  able to scale and evolve with corporate changes.

Entities have been known to take up to six months determining a naming paradigm for their software model. Furthermore, restrictions within the way that APM platform agents report data make this list even more difficult to achieve, so the techniques herein provide a reasonable starting point for naming with sensible defaults as well as provide a customization layer.

Note, too, that additional naming constraints exacerbate the issue even further, such as that facts that often:
  App/Tier/Node names must be determined when instrumentation is initiated,
  Metrics are permanently associated with the App/Tier/Node,
  Metrics are permanently associated with this data,
  Renaming of App/Tier/Node is not supported,
  Reregistering a node with different names is possible, but this does not migrate the old data,
  Naming must be performed before the software can benefit from knowledge gained by instrumentation,
  and many other constraints.

For Instrumentation at block 1918, during Setup, the attributes map is populated by the decorator with information relative to detection. After Naming, the map is populated by decorator with additional information based on the language of the match, such as the location of a language agent binary or an Environment variable that should be set.

The blocks in FIG. 19 with dashed lines (e.g., blocks 1910 and 1916) may also be potentially customizable. This customization may take the form of either a proprietary or readily available language.

Note too that the techniques herein gather data transactionally, and each transaction may be associated with an App: Tier: Node. Instead of renaming any of these components, the techniques herein are directed at getting a proper name up front, and can also be used to reregister an agent with a new App: Tier: Node (notably potentially without migrating the old data to the new App: Tier: Node).

The techniques described above thus provide a simplified model of the entity's business by attempting to detect clusters spanning several machines using an algorithm that names process-tiers consistently by their type, launch context, and parameterization. In this way, processes that meet these criteria are naturally bucketed in the same tier since they have the same tier name. However, as also mentioned above, there are issues with this approach. Often times correct naming cannot be determined locally and require a global view. Other times, the entities may have scale such that the size of the cluster is either unmanageable or does not reflect the actual business. For example, the entity may have many processes that perform the same role, and are logically monitored together, but physically are divided geographically and should be in geographically named tiers. Alternatively, different business units might have processes performing similar roles that need to be monitored separately. In addition, entities might feel that generated names are too esoteric. For these reasons, entities must be able to write custom code that detects processes, determines their role, and suggests appropriate names.

Since it is very difficult to write code in advance that is capable of being customized in some simple way by the entity and still be general purpose, the present disclosure concludes that full custom scripts are the clear solution. However, supporting the execution of a general purpose language poses a security risk (and it is desired to let the entity have the final say as to the disposition of accesses to controlled space as well as security logging). This requirement is independent of whether the code to perform detection and naming is provided by the Zero Agent described herein or by the entity—that is, there must be a way to control and monitor accesses to controlled space and provide appropriate security logging and alerting.

The techniques herein, therefore, are directed to a security pipeline, in which the operations performing in detection and naming, or any operation in general, are separated from accesses to controlled space.

In particular, if not explicitly understood from the description above, the executed code "bounces back and forth" between two types of stages-execution of entity scripts or the Zero Agent scripts, in a controlled environment with limited external access and limited side effects, and a stage that is designed to handle accesses to controlled space. The controlled space stage fields requests from the calculation stage, restricts and audits accesses, then returns to the calculation stage on success.

The controlled space stage is sophisticated enough to handle accesses to accessible data via inaccessible means. For example, the internet may be locked down, but a http call to a particular website is allowed. The system herein might allow access to a particular XML file, but restrict the ability to read a system XML file that determines which user file to access.

Where the system herein would want to prevent a script from reading the System File in order to get to the User file, the controlled-space stage herein could manage this kind of access and restrict based on the reading of the data and not the route.

The overall flow is thus that Zero Agent or Entity multi-stage Scripts are preloaded in the system, and then at Compute-time, the calculation stage is run in a side-effect free sandbox. The stage outputs a list of controlled space accesses. If the accesses are successful, the next calculation stage is executed.

Therefore, the techniques herein provide a methodology to support custom detection and naming securely, generally through a secure methodology where entity code is to be executed, avoiding code injection dangers, and managing access to controlled space. Specifically, in the problem space of auto-configuration, the pipeline steps above can be restated generally as follows:

Detection: Software must examine the target environment and gather information. That is, by looking at command line, what type of process is it? (For example, what type of Java process? Tomcat?)

Extraction: More information is gathered from configuration files in preparation for Naming. In particular, now that the type of process is known, look at the environment to determine what is important. (for example, for Tomcat, there are directories, ports, etc.)

Naming: Detection information must be merged with any global topology information in order to determine a bucket for the metrics that are produced by this agent. This allows an entity to monitor clusters of processes that perform the same role and report together. The output of this phase is a logical name of the bucket (i.e., creating a name for that process based on process type and extracted information above).

Referencing: Creating a human readable reference name for the complex name created in the previous stage. (The level of detail of the naming determines the level of clusterization.)

Decoration: Using the created name to add to the command line to instrument the process (e.g., resuming with a new command line).

Instrumentation.

In this manner, optimal auto-configuration code will be able to, say, use a locally executed algorithm to grant a name that would be accurate across the entire topology. For example, a small enterprise might see all of its similarly deployed tomcat servers bucketed together and named intuitively. However, this breaks down as the complexity of the enterprise grows. Although deployed identically (due to a standard deployment designed by the IT department) the tomcat servers in Engineering and Accounting might need to be bucketed differently. A larger organization might face the challenge that Engineering-East and Engineering-West should be separated. According to the techniques herein, however, the advanced pipelining solution offered by the zero agent, which is downloaded onto the target system (and launched on demand using LD_PRELOAD-All configuration scripts are already loaded on the system, and no interaction between the entity and the software occurs), loops through executing the Detection module code in a sandbox that has no access to controlled space, but does receive basic system and process information in key-value pairs, in order of precedence until one returns a "match." Once a match occurs, the Detection phase is complete, but if the algorithm is disabled, the process stops. Next, the software checks whether there is an Extraction phase. If so, this code is executed in a sandbox without access to controlled space, but does receive the key-value pairs. It can also request a list of data items it wants extracted from the file system or internet or other controlled space. These items may either be direct reads or tunneled reads (read an index file in order to get the location of a second file-tomcat needs this). This is subject to the security restrictions of the box, including allow/disallow lists, logging. The custom phase is Naming, which takes the accumulated key value pairs and runs the Naming module code in a sandbox with no access to controlled space, returning an accumulation of key-value pairs. The "Referencing" stage does not exist for us until we support all levels of tier rename or tier name aliasing. Lastly, the Instrumentation stage (which is likely not provided by the entity, but in theory, could be) adds the extra parameters to the command line.

Figure 20:
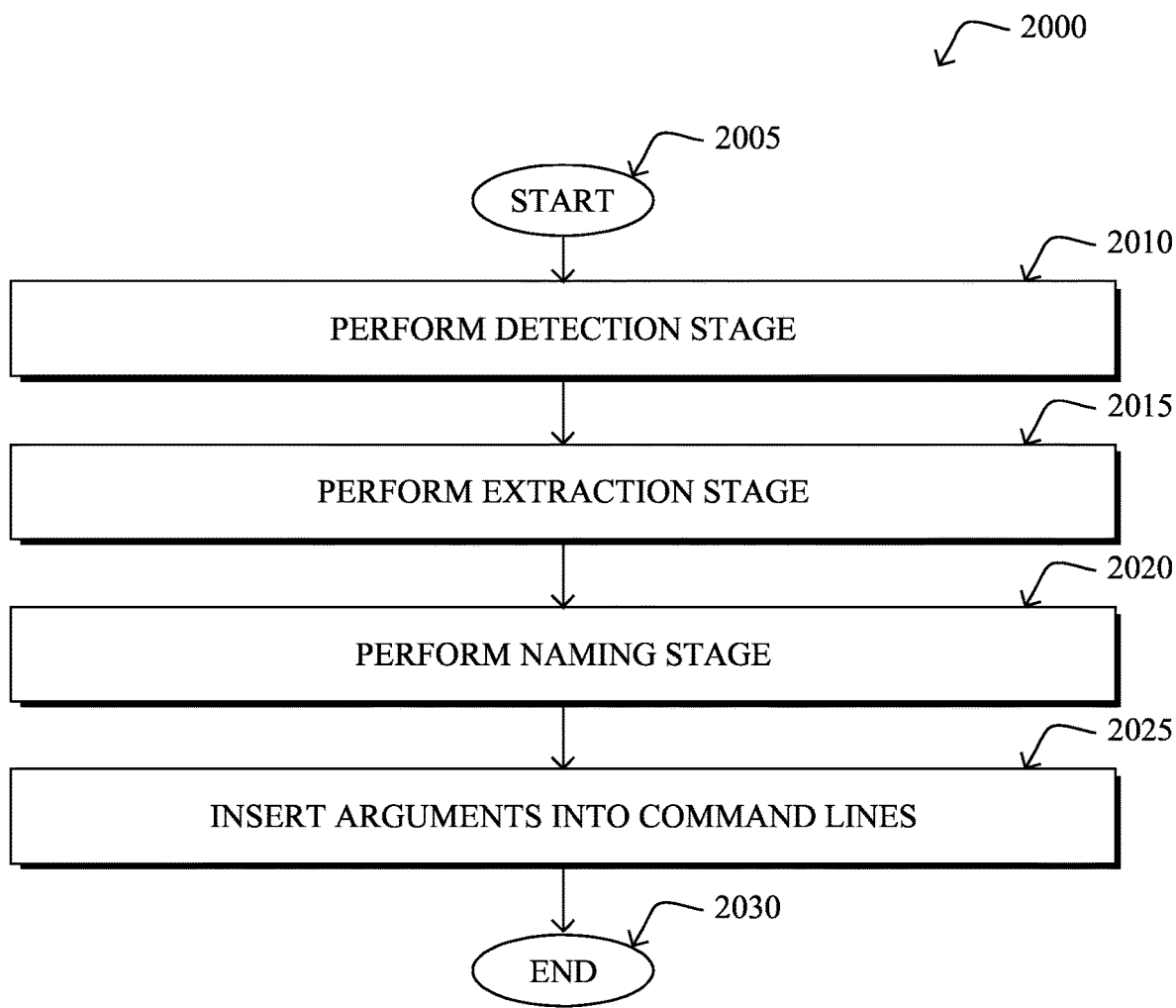
FIG. 20 illustrates an example simplified procedure for secure support of customization scripts using pipelining.

In closing, FIG. 20 illustrates an example simplified procedure for secure support of customization scripts using pipelining, in accordance with one or more embodiments described herein. For example, a non-generic, specifically configured device (e.g., device 200) may perform procedure 2000 by executing stored instructions (e.g., illustrative application monitoring process 248). The procedure 2000 may start at step 2005, and continues to step 2010, where, as described in greater detail above, the device may perform a detection stage of an automated instrumentation pipeline during which the apparatus detects an application server type by examining a command line of a process of an application. In various embodiments, the application server type comprises at least one of: Tomcat, JBoss, Glassfish, WebLogic, or WebSphere. In one embodiment, the device may also inject a preload library into each process of the application, to capture command line arguments of that process.

At step 2015, as detailed above, the device may perform, based on the application server type, an extraction stage of the automated instrumentation pipeline during which the apparatus extracts application server attributes.

At step 2020, the device may perform, based on the application server attributes, a naming stage of the automated instrumentation pipeline during which the apparatus forms a naming hierarchy for processes of the application, as described in greater detail above. In some embodiments, processes of the application that perform a same function are grouped by the naming hierarchy as a single tier. In another embodiment, the device may perform the naming stage of the automated instrumentation pipeline according to one or more defined naming rules. In another embodiment, the device may disable instrumentation for a portion of the application, using the naming hierarchy.

In various embodiments, the detection stage, the extraction stage, and the naming stage of the automated instrumentation pipeline do not have access to a controlled space of the application. In one embodiment, the controlled space of the application comprises at least one of: a file system or a network connection associated with the application. In one embodiment, the detection stage, the extraction stage, and the naming stage are performed in a sandbox environment. In another embodiment, the device may construct an attribute map for a particular process of the application indicative of a process identifier, its command line arguments, environment variables, and a current working directory. In turn, the apparatus may perform the detection stage on the particular process based in part on the attribute map.

At step 2025, as detailed above, the device may insert, based in part on the naming hierarchy, arguments into command lines of processes of the application that cause the processes of the application to be instrumented at runtime.

The simplified procedure 2000 may then end in step 2030, notably with the ability to continue ingesting and processing data.

It should be noted that while certain steps within procedure 2000 may be optional as described above, the steps shown in FIG. 20 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the secure support of customization scripts using pipelining. In particular, the techniques herein address auto-instrumenting, and also how to name processes (e.g., a naming hierarchy comprising tiers and nodes) for a dictionary of key-value pairs. That is, self-configuration using the techniques herein allows an entity to install software that is nearly ready "out of the box," where the remaining customizations and tweaks are relatively painless, being able to scale across the entity's topology (including being adaptable to changes to the topology), and being maintainable over time.

Specifically, entities know at a high level what their software does, and their developers know it line by line, but automatically creating a model that produces business value requires a different way of thinking. Determining which applications should be monitored, sorting them into tiers and naming them, has become a huge to-do that can drag on for months at an entity. Committees are formed to determine the best way to go from the start. Configuration changes and correction of mistakes can be daunting. If a change needs to occur, companies risk losing legacy data as metrics cannot be tracked effectively past renames, and point-of-installation reconfiguration is required in most cases. Entities find that they need to write scripts or puppet out their application startup files and stage restarts. This creates even more barriers to correction.

Generally, it has been extremely difficult to detect and instrument out of the box for the rich diversity of entity configurations, while also determining node redundancy in order to support tier auto-naming and clusterization within the constraints of the deployment model. The most difficult constraints are that renaming tiers causes data loss, so we are required to get configuration correct upon initial execution, and that the software operates at a local and must not only account for conflicts at the global level, but also account for evolution of the topology and software over time.

The techniques herein thus alleviate these concerns by providing the auto-instrumentation as described above, particularly in a robust and user-friendly manner (e.g., outside of the administrator role, in particular). The techniques specifically provide a "backdoor" for Professional Services to perform custom naming, but more specifically providing Security Pipelining and Contextual Access.

Also, contrary to conventional techniques, the system herein does not need administrator access, while still allowing for a Security team to either monitor or block the accesses. That is, the techniques herein are designed to operate on top of the existing security model, which is able to block access to files, directories, provide logging and auditing. Furthermore, conventional techniques are insufficient for detecting and naming enterprise custom frameworks. For example, it is not strong enough to detect the same platforms that it detects in its internal binaries. As an example, Tomcat has a set of xml files that determine how the product is configured and deployed, and how it should be named. Conventional custom detection code would not be able to read or traverse through these files, whereas the techniques herein are designed so that all frameworks could potentially be detected using the security pipeline, not just the extra ones. Lastly, unlike conventional techniques, which can only partition hosts into host-groups for clusterization (i.e., it is not possible to have overlapping partitions based on role and function-such as where Engineering might want to separate its servers one way, and Accounting may prefer to separate servers another way), the techniques herein can provide more intuitive naming and customization, accordingly, to address such partitions as desired.

Illustratively, the techniques described herein may be performed by hardware, software, and/or firmware, such as in accordance with the illustrative application monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, an apparatus is disclosed comprising: one or more network interfaces to communicate with a network; a processor coupled to the one or more network interfaces and configured to execute one or more processes; and a memory configured to store a process that is executable by the processor, the process when executed configured to: perform a detection stage of an automated instrumentation pipeline during which the apparatus detects an application server type by examining a command line of a process of an application; perform, based on the application server type, an extraction stage of the automated instrumentation pipeline during which the apparatus extracts application server attributes; perform, based on the application server attributes, a naming stage of the automated instrumentation pipeline during which the apparatus forms a naming hierarchy for processes of the application, wherein the detection stage, the extraction stage, and the naming stage of the automated instrumentation pipeline do not have access to a controlled space of the application; and insert, based in part on the naming hierarchy, arguments into command lines of processes of the application that cause the processes of the application to be instrumented at runtime.

According to the embodiments herein, a method is disclosed comprising: performing, by a device, a detection stage of an automated instrumentation pipeline during which the device detects an application server type by examining a command line of a process of an application; performing, by the device and based on the application server type, an extraction stage of the automated instrumentation pipeline during which the device extracts application server attributes; performing, by the device and based on the application server attributes, a naming stage of the automated instrumentation pipeline during which the device forms a naming hierarchy for processes of the application, herein the detection stage, the extraction stage, and the naming stage of the automated instrumentation pipeline do not have access to a controlled space of the application; and inserting, by the device and based in part on the naming hierarchy, arguments into command lines of processes of the application that cause the processes of the application to be instrumented at runtime.

In one embodiment, the controlled space of the application comprises at least one of: a file system or a network connection associated with the application. In another embodiment, the application server type comprises at least one of: Tomcat, JBoss, Glassfish, WebLogic, or WebSphere. In a further embodiment, the method also comprises injecting a preload library into each process of the application, to capture command line arguments of that process. In one embodiment, processes of the application that perform a same function are grouped by the naming hierarchy as a single tier. In yet another embodiment, the device performs the naming stage of the automated instrumentation pipeline according to one or more defined naming rules. In an additional embodiment, the method also includes disabling instrumentation for a portion of the application, using the naming hierarchy. In a further embodiment, the detection stage, the extraction stage, and the naming stage are performed in a sandbox environment. In another embodiment, the method also includes constructing an attribute map for a particular process of the application indicative of a process identifier, its command line arguments, environment variables, and a current working directory, wherein the device performs the detection stage on the particular process based in part on the attribute map. In an additional embodiment, the application is a Java application.

Further, according to the embodiments herein, a tangible, non-transitory, computer-readable medium is disclosed that stores program instructions that cause a device to execute a process comprising: performing, by the device, a detection stage of an automated instrumentation pipeline during which the device detects an application server type by examining a command line of a process of an application; performing, by the device and based on the application server type, an extraction stage of the automated instrumentation pipeline during which the device extracts application server attributes; performing, by the device and based on the application server attributes, a naming stage of the automated instrumentation pipeline during which the device forms a naming hierarchy for processes of the application, wherein the detection stage, the extraction stage, and the naming stage of the automated instrumentation pipeline do not have access to a controlled space of the application; and inserting, by the device and based in part on the naming hierarchy, arguments into command lines of processes of the application that cause the processes of the application to be instrumented at runtime.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. For example, while certain terms have been used herein, such as tiers and nodes, other protocols may use other terms while still remaining within the scope of the present disclosure, such as process groups (instead of tiers), split process groups due to host grouping (instead of tiers with longer names, such as "EAST-tomcat-server"), and so on. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller," those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
performing, by a device, a detection stage of an automated instrumentation pipeline during which the device detects an application server type by examining a command line of a process of an application;
performing, by the device and based on the application server type, an extraction stage of the automated instrumentation pipeline during which the device extracts application server attributes;
performing, by the device and based on the application server attributes, a naming stage of the automated instrumentation pipeline during which the device forms a naming hierarchy for processes of the application,
wherein the detection stage, the extraction stage, and the naming stage of the automated instrumentation pipeline do not have access to a controlled space of the application; and
inserting, by the device and based in part on the naming hierarchy, arguments into command lines of processes of the application that cause the processes of the application to be instrumented at runtime.

2. The method as in claim 1, wherein the controlled space of the application comprises at least one of: a file system or a network connection associated with the application.

3. The method as in claim 1, wherein the application server type comprises at least one of: Tomcat, JBoss, Glassfish, WebLogic, or WebSphere.

4. The method as in claim 1, further comprising:
injecting a preload library into each process of the application, to capture command line arguments of that process.

5. The method as in claim 1, wherein processes of the application that perform a same function are grouped by the naming hierarchy as a single tier.

6. The method as in claim 1, wherein the device performs the naming stage of the automated instrumentation pipeline according to one or more defined naming rules.

7. The method as in claim 1, further comprising:
disabling instrumentation for a portion of the application, using the naming hierarchy.

8. The method as in claim 1, wherein the detection stage, the extraction stage, and the naming stage are performed in a sandbox environment.

9. The method as in claim 1, further comprising:
constructing an attribute map for a particular process of the application indicative of a process identifier, its command line arguments, environment variables, and a current working directory, wherein the device performs the detection stage on the particular process based in part on the attribute map.

10. The method as in claim 1, wherein the application is a Java application.

11. An apparatus, comprising:
one or more network interfaces;
a processor coupled to the one or more network interfaces and configured to execute one or more processes; and
a memory configured to store a process that is executable by the processor, the process when executed configured to:
perform a detection stage of an automated instrumentation pipeline during which the apparatus detects an application server type by examining a command line of a process of an application;
perform, based on the application server type, an extraction stage of the automated instrumentation pipeline during which the apparatus extracts application server attributes;
perform, based on the application server attributes, a naming stage of the automated instrumentation pipeline during which the apparatus forms a naming hierarchy for processes of the application, wherein the detection stage, the extraction stage, and the naming stage of the automated instrumentation pipeline do not have access to a controlled space of the application; and insert, based in part on the naming hierarchy, arguments into command lines of processes of the application that cause the processes of the application to be instrumented at runtime.

12. The apparatus as in claim 11, wherein the controlled space of the application comprises at least one of: a file system or a network connection associated with the application.

13. The apparatus as in claim 11, wherein the application server type comprises at least one of: Tomcat, JBoss, Glassfish, WebLogic, or WebSphere.

14. The apparatus as in claim 11, wherein the process when executed is further configured to:

inject a preload library into each process of the application, to capture command line arguments of that process.

15. The apparatus as in claim 11, wherein processes of the application that perform a same function are grouped by the naming hierarchy as a single tier.

16. The apparatus as in claim 11, wherein the apparatus performs the naming stage of the automated instrumentation pipeline according to one or more defined naming rules.

17. The apparatus as in claim 11, wherein the process when executed is further configured to:

disable instrumentation for a portion of the application, using the naming hierarchy.

18. The apparatus as in claim 11, wherein the detection stage, the extraction stage, and the naming stage are performed in a sandbox environment.

19. The apparatus as in claim 11, wherein the process when executed is further configured to:

construct an attribute map for a particular process of the application indicative of a process identifier, its command line arguments, environment variables, and a current working directory, wherein the apparatus performs the detection stage on the particular process based in part on the attribute map.

20. A tangible, non-transitory, computer-readable medium storing program instructions that cause a device to execute a process comprising:

performing, by the device, a detection stage of an automated instrumentation pipeline during which the device detects an application server type by examining a command line of a process of an application;

performing, by the device and based on the application server type, an extraction stage of the automated instrumentation pipeline during which the device extracts application server attributes;

performing, by the device and based on the application server attributes, a naming stage of the automated instrumentation pipeline during which the device forms a naming hierarchy for processes of the application, wherein the detection stage, the extraction stage, and the naming stage of the automated instrumentation pipeline do not have access to a controlled space of the application; and inserting, by the device and based in part on the naming hierarchy, arguments into command lines of processes of the application that cause the processes of the application to be instrumented at runtime.

* * * * *